US012780044B2

(12) United States Patent
Tsuda

(10) Patent No.: US 12,780,044 B2
(45) Date of Patent: Nov. 3, 2026

(54) TEMPERATURE ADJUSTMENT MECHANISM

(71) Applicant: ISUZU MOTORS LIMITED, Tokyo (JP)

(72) Inventor: Kenichiro Tsuda, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 541 days.

(21) Appl. No.: 18/551,477

(22) PCT Filed: Mar. 17, 2022

(86) PCT No.: PCT/JP2022/012160
§ 371 (c)(1),
(2) Date: Sep. 20, 2023

(87) PCT Pub. No.: WO2022/202589
PCT Pub. Date: Sep. 29, 2022

(65) Prior Publication Data
US 2024/0166089 A1 May 23, 2024

(30) Foreign Application Priority Data
Mar. 22, 2021 (JP) ................................ 2021-047448

(51) Int. Cl.
*B60L 58/27* (2019.01)
*B60H 1/08* (2006.01)
(Continued)

(52) U.S. Cl.
CPC ................ *B60L 58/26* (2019.02); *B60H 1/08* (2013.01); *B60H 1/22* (2013.01); *B60L 58/27* (2019.02); *B60L 2240/545* (2013.01)

(58) Field of Classification Search
None
See application file for complete search history.

(56) References Cited

U.S. PATENT DOCUMENTS

2013/0000325 A1 1/2013 Asai et al.
2013/0213632 A1 8/2013 Morita et al.
(Continued)

FOREIGN PATENT DOCUMENTS

CN 103492204 A 1/2014
CN 110239305 A 9/2019
(Continued)

OTHER PUBLICATIONS

English translation of JP 2013/256255 (Year: 2013).*
(Continued)

*Primary Examiner* — Yoshitoshi Takeuchi
(74) *Attorney, Agent, or Firm* — PROCOPIO, CORY, HARGREAVES & SAVITCH LLP

(57) ABSTRACT

A temperature adjustment mechanism for a vehicle includes a battery-applied pump and circulation paths, and adjusts a temperature of a battery chargeable from an external power supply outside the vehicle to be within a predetermined temperature range. The temperature adjustment mechanism further includes a vacuum insulation tank in which either cold water generated by a cold energy source or hot water heated by a hot energy source is stored according to an ambient temperature during charging of the battery from the external power supply. At a time of input and output of electric power in the battery excluding a charge from the external power supply, the vacuum insulation tank is connected to the circulation paths, the cold water or the hot water stored in the vacuum insulation tank is supplied to the battery by driving the battery-applied pump, and a battery temperature is kept within the temperature range.

8 Claims, 12 Drawing Sheets

(51) Int. Cl.

| | |
|---|---|
| ***B60H 1/22*** | (2006.01) |
| ***B60L 58/26*** | (2019.01) |
| ***H01M 10/61*** | (2014.01) |
| ***H01M 10/613*** | (2014.01) |
| ***H01M 10/615*** | (2014.01) |

(56) References Cited

U.S. PATENT DOCUMENTS

| | | | |
|---|---|---|---|
| 2014/0041826 | A1 | 2/2014 | Takeuchi et al. |
| 2019/0275858 | A1 | 9/2019 | Seki et al. |

FOREIGN PATENT DOCUMENTS

| | | | | |
|---|---|---|---|---|
| JP | 2000-059918 A | | 2/2000 | |
| JP | 2007/238141 | * | 9/2007 | ............. B65D 81/20 |
| JP | 2009-224256 A | | 10/2009 | |
| JP | 2010-023527 A | | 2/2010 | |
| JP | 2012-096589 A | | 5/2012 | |
| JP | 2013/256255 | * | 12/2013 | ............... B60H 1/22 |
| JP | 2013-256255 A | | 12/2013 | |

OTHER PUBLICATIONS

English translation of JP 2007/238141 (Year: 2007).*
Patent Cooperation Treaty, International Search Report, Application No. PCT/JP2022/012160, dated Jun. 7, 2022, in 5 pages.
Patent Cooperation Treaty, WOSA, Application No. PCT/JP2022/012160, dated Jun. 7, 2022, in 5 pages.
The State Intellectual Property Office of People's Republic of China, The First Office Action, Application No. 202280023965.5, dated Mar. 27, 2026, in 12 pages.
German Patent and Trademark Office, Office Action, Application No. 112022000749.4 issue on Mar. 9, 2026, in 12 pages.

* cited by examiner

TEMPERATURE ADJUSTMENT MECHANISM

CROSS-REFERENCE TO RELATED APPLICATIONS

This application is US National Stage of International Patent Application PCT/JP2022/012160, filed Mar. 17, 2022, which claims benefit of priority from Japanese Patent Application 2021-047448, filed Mar. 22, 2021, the contents of both of which are incorporated herein by reference.

TECHNICAL FIELD

The present disclosure relates to a temperature adjustment mechanism, and more particularly, to a temperature adjustment mechanism that is mounted on a vehicle and adjusts a temperature of a battery chargeable from an external power supply.

BACKGROUND ART

There has been proposed a vehicle-applied cold storage control device in which, during a period in which a battery is charged from an external power supply, a heat pump cycle is driven based on consumption of electric power from the external power supply to store heat in a heat storage device or store cold in a cold storage material (for example, see Patent Literature 1).

CITATION LIST

Patent Literature

Patent Literature 1: JP2010-023527A

SUMMARY OF INVENTION

Technical Problem

The device described in Patent Literature 1 uses the stored heat for warming-up or heating, and uses the stored cold energy for cooling. However, in the device, when a driver does not use heating or cooling, the stored heat or stored cold energy is wasted.

In order to maintain the life of the battery, it is necessary to maintain a temperature of the battery within an appropriate temperature range. Since a mechanism for adjusting the temperature of the battery is limited in air cooling, a mechanism using a coolant is well known. However, as in the device described in Patent Literature 1, in a circulation path of the coolant using an air-cooled heat exchanger, the temperature of the battery may rise above a temperature range in summer in which an ambient temperature is high in Japan, and the temperature of the battery may fall below the temperature range in winter in which the ambient temperature is low. Therefore, there is a problem that, in the circulation path using the air-cooled heat exchanger, the temperature of the battery cannot be kept within the appropriate temperature range in summer or winter, and the life of the battery is short.

In this regard, in order to maintain the temperature of the battery within the appropriate temperature range even in summer or winter, the temperature of the battery can be kept within the appropriate temperature range by cooling or heating the coolant with a cold energy source or a hot energy source driven by the electric power in the battery. However, there is another problem that the electric power charged in the battery is consumed by the cold energy source or the hot energy source and decrease in a charge amount of the battery is accelerated. The problem that the decrease in the charge amount of the battery is accelerated is a factor that shortens a cruising distance of an electric vehicle.

An object of the present disclosure is to provide a temperature adjustment mechanism that reduces electric power consumption during traveling while extending the life of a battery.

Solution to Problem

A temperature adjustment mechanism according to an aspect of the present disclosure that achieves the above object is a temperature adjustment mechanism for a vehicle, the temperature adjustment mechanism including a battery-applied pump and a circulation path, and configured to adjust a temperature of a battery, which is chargeable from an external power supply outside the vehicle, to be within a predetermined temperature range by driving the battery-applied pump to allow a coolant to circulate through the circulation path, the temperature adjustment mechanism further including a vacuum insulation tank in which either cold water generated by a cold energy source due to consumption of energy or hot water heated by a hot energy source due to consumption of energy is stored according to an ambient temperature around the vehicle during charging of the battery from the external power supply, in which at a time of input and output of electric power in the battery excluding a charge from the external power supply, the vacuum insulation tank is connected to the circulation path, the cold water or the hot water stored in the vacuum insulation tank is supplied to the circulation path by driving the battery-applied pump, and battery temperature adjustment is performed such that the temperature of the battery is kept within the temperature range.

Advantageous Effects of Invention

According to an aspect of the present disclosure, cold water or hot water is stored in a vacuum insulation tank by consuming energy in a situation where electric power may be consumed during charging of a battery from an external power supply, and the cold water or the hot water stored in the vacuum insulation tank is used at the time of input and output of electric power in the battery excluding a charge from the external power supply. Therefore, according to one aspect of the present disclosure, battery temperature adjustment can be performed only by consuming the electric power of a battery-applied pump at the time of input and output of electric power in the battery excluding a charge from the external power supply, and electric power consumption required to extend life of the battery can be reduced. Accordingly, it is possible to reduce the decrease in a charge amount of the battery and extend a cruising distance of the vehicle while extending the life of the battery.

DESCRIPTION OF EMBODIMENTS

Figure 1:
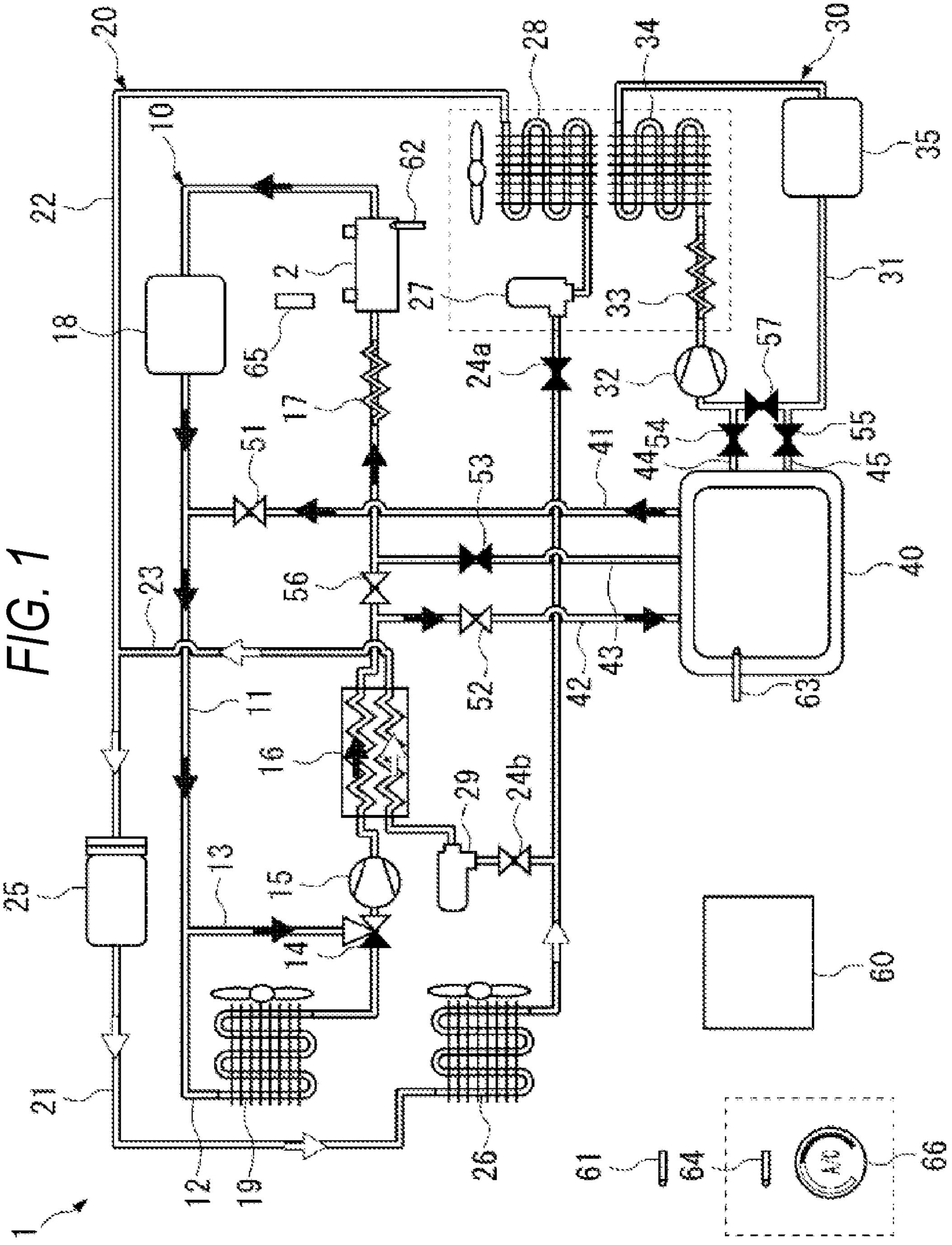
FIG. 1 is a configuration diagram illustrating a temperature adjustment mechanism according to a first embodiment, and illustrates a state in which cold water is stored in a vacuum insulation tank when a battery is charged from an external power supply.

Hereinafter, embodiments of a temperature adjustment mechanism according to the present disclosure will be described.

In FIGS. 1 to 5 and 12, filled arrows indicate a flow of a coolant, and white arrows indicate a flow of a refrigerant. Each of heaters (17, 33) is indicated by a filled arrow when driven and a white arrow when stopped. Each of flow rate control devices and valve devices (14, 24*a*, 24*b*, 51 to 57, 74*a* to 74*d*) is indicated by the filled arrow when a flow path is closed, and is indicated by the white arrow when the flow path is opened. A portion surrounded by dotted lines is assumed to be installed in a vehicle compartment of a vehicle. An electric wire for supplying electric power and a signal line for transmitting a signal are omitted to avoid complexity.

As illustrated in FIGS. 1 to 5, a temperature adjustment mechanism 1 according to a first embodiment is mounted on an electric vehicle using an electric motor (not illustrated) that is driven by electric power of a battery 2 as a drive source. The battery 2 is chargeable by an external power supply (not illustrated). Examples of the external power supply include a single-phase alternating current 100 V or 200 V outlet, a standing charger with a cable, and a three-phase 200 V rapid charger.

The temperature adjustment mechanism 1 is a mechanism that allows the coolant to circulate through circulation paths (11 to 13) to adjust a temperature of the battery 2 (hereinafter, referred to as a battery temperature Tb) to be within a preset temperature range from a lower limit T1 to an upper limit Th. In the present disclosure, the temperature range is set in advance according to a type and a specification of the battery 2. When the battery 2 is a lithium-ion battery, the temperature range of the battery 2 is, for example, 0° C. to 35° C., more preferably 16° C. to 25° C.

The temperature adjustment mechanism 1 includes a battery temperature adjustment circuit 10, a cooling circuit 20, a heating circuit 30, a vacuum insulation tank 40, connection pipes 41 to 45, and a flow path switching device 50 (The reference numeral 50 is not illustrated in the drawing. The reference numeral 50 is a generic term for valve devices disposed in the connection pipes and circuits.). The temperature adjustment mechanism 1 includes a control device 60, an ambient temperature acquisition device 61, a battery temperature acquisition device 62, a stored water temperature acquisition device 63, a room temperature acquisition device 64, an electric power amount acquisition device 65, and a required temperature setting device 66.

The battery temperature adjustment circuit 10 is a circuit in which the coolant circulates through the circulation path, and includes a battery-applied common passage 11, a cooling passage 12, a bypass passage 13, and a battery-applied flow path switching device 14. The cooling passage 12 and the bypass passage 13, which are parallel to each other, branch from the battery-applied common passage 11 and join the battery-applied common passage 11 again. The battery-applied flow path switching device 14 including a three-way valve switches a flow path of the coolant to either the cooling passage 12 or the bypass passage 13.

In the battery-applied common passage 11, a battery-applied pump 15, a refrigerant-applied heat exchanger 16, a battery-applied electric heater 17, the battery 2, and a sub-tank 18 are arranged in order with respect to the flow of the coolant. An air-cooled heat exchanger 19 is disposed in the cooling passage 12.

In the battery temperature adjustment circuit 10, the battery-applied pump 15 is driven based on the electric power in the battery 2 at the time of input or output of electric power in the battery 2, and the coolant circulates through a circulation path including the battery-applied common passage 11, the cooling passage 12, and the bypass passage 13. In the battery temperature adjustment circuit 10, when the battery temperature Tb exceeds the upper limit Th even though the coolant passes through the cooling passage 12 by the battery-applied flow path switching device 14, the coolant is cooled by exchanging heat between the coolant in the refrigerant-applied heat exchanger 16 and the refrigerant in the cooling circuit 20. In the battery temperature adjustment circuit 10, when the battery temperature Tb falls below the lower limit T1 even when the coolant passes through the bypass passage 13 by the battery-applied flow path switching device 14, the coolant is directly heated by the battery-applied electric heater 17.

The cooling circuit 20 is a circuit through which the refrigerant circulates, and includes a cooling-applied common passage 21, a cooling-applied passage 22, a battery-applied passage 23, and a cooling-applied flow path switching device 24 (The reference numeral 24 is not illustrated in the drawing. The reference numeral 24 is a generic term for a first cooling-applied valve device 24*a* and a second cooling-applied valve device 24*b* that are disposed in the cooling-applied passage 22 and the battery-applied passage 23, respectively.). The cooling-applied passage 22 and the battery-applied passage 23, which are parallel to each other, branch from the cooling-applied common passage 21 and join the cooling-applied common passage 21 again. The cooling-applied flow path switching device 24 including two valve devices switches a flow path of the refrigerant to either the cooling-applied passage 22 or the battery-applied passage 23 or to both the cooling-applied passage 22 and the battery-applied passage 23 according to a difference between a room temperature Tr and a required temperature Td and a usage situation of the refrigerant in the battery temperature adjustment circuit 10. The refrigerant is not particularly limited, and examples thereof include hydrofluoroolefin (HFO-1234yf).

In the cooling-applied common passage 21, an electric compressor 25 and a condenser 26 are disposed in this order with respect to the flow of the refrigerant. In the cooling-applied passage 22, an expansion valve 27 and an evaporator 28 are disposed in this order with respect to the flow of the refrigerant. An expansion valve 29 and the refrigerant-applied heat exchanger 16 are disposed in the battery-applied passage 23 with respect to the flow of the refrigerant. The expansion valve 27 and the evaporator 28 are installed in the vehicle compartment.

In the cooling circuit 20, when the room temperature Tr in the vehicle compartment is higher than the required temperature Td desired by the occupant, the electric compressor 25 is driven by the electric power in the battery 2, the cooling-applied passage 22 is opened by the first cooling-applied valve device 24*a*, and the refrigerant is circulated through the cooling-applied common passage 21 and the cooling-applied passage 22. A high-pressure and high-temperature refrigerant discharged from the electric compressor 25 is cooled and liquefied by vehicular speed air generated by the condenser 26 and cooling air generated by a subsequent electric cooling fan. Next, a high-pressure and low-temperature liquefied refrigerant is sprayed in the form of mist by the expansion valve 27. The sprayed refrigerant is vaporized by the air blown by a subsequent electric fan in the evaporator 28, and heat of vaporization is taken from the air. Cold air is blown into the vehicle compartment, and the room temperature Tr is adjusted to the required temperature Td through the above process.

In the cooling circuit 20, in a situation where the battery temperature adjustment circuit 10 uses the refrigerant to cool the coolant in the refrigerant-applied heat exchanger 16, the electric compressor 25 is driven by the electric power in the battery 2, the battery-applied passage 23 is opened by the second cooling-applied valve device 24*b*, and the refrigerant is circulated in the cooling-applied common passage 21 and the battery-applied passage 23. The high-pressure and high-temperature refrigerant discharged from the electric compressor 25 is cooled and liquefied by the condenser 26. Next, a high-pressure and low-temperature liquefied refrigerant is sprayed in the form of mist by the expansion valve 29. The sprayed refrigerant is vaporized by heat exchange with the coolant in the refrigerant-applied heat exchanger 16, and heat of vaporization is taken from the coolant. The coolant is cooled in the refrigerant-applied heat exchanger 16 through the process described above.

The heating circuit 30 is a circuit through which the coolant circulates, and includes a heating-applied circulation passage 31. In the heating-applied circulation passage 31, a heating-applied pump 32, a heating-applied electric heater 33, a heating-applied heat exchanger 34, and a sub-tank 35 are disposed in this order with respect to the flow of the coolant. The heating-applied electric heater 33 and the heating-applied heat exchanger 34 are installed in the vehicle compartment.

In the heating circuit 30, when the room temperature Tr in the vehicle compartment is lower than the required temperature Td desired by the occupant, the heating-applied pump 32 is driven by the electric power in the battery 2 to allow the coolant to circulate through the heating-applied circulation passage 31, and the heating-applied electric heater 33 is driven by the electric power in the battery 2 to heat the coolant. The heated coolant exchanges heat with the air blown by the subsequent electric fan in the heating-applied heat exchanger 34 to warm the air. The hot air is blown into the vehicle compartment, and the room temperature Tr is adjusted to the required temperature Td through the above-described process.

The vacuum insulation tank 40 has a double structure including an outer tank and an inner tank, and has a vacuum layer formed between the outer tank and the inner tank. The vacuum insulation tank 40 is configured such that transmission of heat between an outside of the tank and the coolant stored in the inner tank covered with the vacuum layer is blocked by the vacuum layer and a temperature of the stored coolant is kept for a long period of time. The cold water or the hot water is stored in the vacuum insulation tank 40 according to the ambient temperature Ta.

In the present disclosure, the ambient temperature Ta indicates a temperature of air (also referred to as an outside air temperature) around the vehicle on which the temperature adjustment mechanism 1 is mounted. The cold water is coolant cooled by a cold energy source due to consumption of energy, and a temperature thereof is at least lower than the upper limit Th of an appropriate temperature range of the battery 2, and preferably lower than the lower limit T1 of the temperature range. In the present embodiment, the cold energy source is the refrigerant of the cooling circuit 20 driven by the electric compressor 25 by the electric power in the battery 2. The hot water is coolant heated by a hot energy source due to consumption of energy, and a temperature thereof is at least higher than the lower limit T1 of the appropriate temperature range of the battery 2, and preferably higher than the upper limit Th of the temperature range. In the present embodiment, the hot energy source is the heating-applied electric heater 33 driven by the electric power in the battery 2.

One end of a first connection pipe 41 communicates with the vacuum insulation tank 40, and the other end communicates with the battery-applied common passage 11 on a downstream side of the battery 2 and on an upstream side of a branch point of the cooling passage 12 and the bypass passage 13 with respect to the flow of the coolant. The first connection pipe 41 is a pipe serving as an outlet from the vacuum insulation tank 40, through which the coolant stored in the vacuum insulation tank 40 passes when the cold water is to be stored in the vacuum insulation tank 40.

One end of a second connection pipe 42 communicates with the vacuum insulation tank 40, and the other end communicates with the battery-applied common passage 11 on a downstream side of the refrigerant-applied heat exchanger 16 and on an upstream side of the battery 2 with respect to the flow of the coolant. The second connection pipe 42 is a pipe serving as an inlet to the vacuum insulation tank 40, through which the cold water passes when the cold water is stored in the vacuum insulation tank 40, and through which the coolant circulating through the battery temperature adjustment circuit 10 passes when the cold water stored in the vacuum insulation tank 40 is supplied to the battery temperature adjustment circuit 10.

One end of a third connection pipe 43 communicates with the vacuum insulation tank 40, and the other end communicates with the battery-applied common passage 11 on a downstream side of the second connection pipe 42 and on an upstream side of the battery 2 with respect to the flow of the coolant. The third connection pipe 43 is a pipe serving as an outlet from the vacuum insulation tank 40, through which the cold water stored in the vacuum insulation tank 40 passes when the cold water is supplied to the battery temperature adjustment circuit 10.

One end of each of a fourth connection pipe 44 and a fifth connection pipe 45 communicates with the vacuum insulation tank 40, and the other end communicates with the heating-applied circulation passage 31. Each of the fourth connection pipe 44 and the fifth connection pipe 45 may be disposed such that the fifth connection pipe 45 is disposed on an upstream side of the fourth connection pipe 44 with respect to the flow of the coolant. The fourth connection pipe 44 is a pipe serving as an outlet from the vacuum insulation tank 40, through which the coolant stored in the vacuum insulation tank 40 passes when the hot water is stored in the vacuum insulation tank 40, and through which the cold water or the hot water stored in the vacuum insulation tank 40 passes when the cold water or the hot water is supplied to the heating circuit 30. The fifth connection pipe 45 is a pipe serving as an inlet to the vacuum insulation tank, through which the hot water passes when the hot water is stored in the vacuum insulation tank 40, and through which the coolant circulating through the heating circuit 30 passes when the cold water or the hot water stored in the vacuum insulation tank 40 is supplied to the heating circuit 30.

A first valve device 51 to a fifth valve device 55 are disposed in the first connection pipe 41 to the fifth connection pipe 45, respectively. Each of the first valve device 51 to the fifth valve device 55 blocks or opens the disposed pipe by opening and closing.

A sixth valve device 56 is disposed in the battery-applied common passage 11 between a communication portion between the second connection pipe 42 and the battery-applied common passage 11 and a communication portion between the third connection pipe 43 and the battery-applied common passage 11. The sixth valve device 56 can freely adjust an opening and closing degree thereof, and can adjust a flow rate of the coolant passing through the sixth valve device 56.

A seventh valve device 57 is disposed in the heating-applied circulation passage 31 between a communication portion between the fourth connection pipe 44 and the heating-applied circulation passage 31 and a communication portion between the fifth connection pipe 45 and the heating-applied circulation passage 31. The seventh valve device 57 blocks and opens the heating-applied circulation passage 31 between the communication portions.

Figure 6:
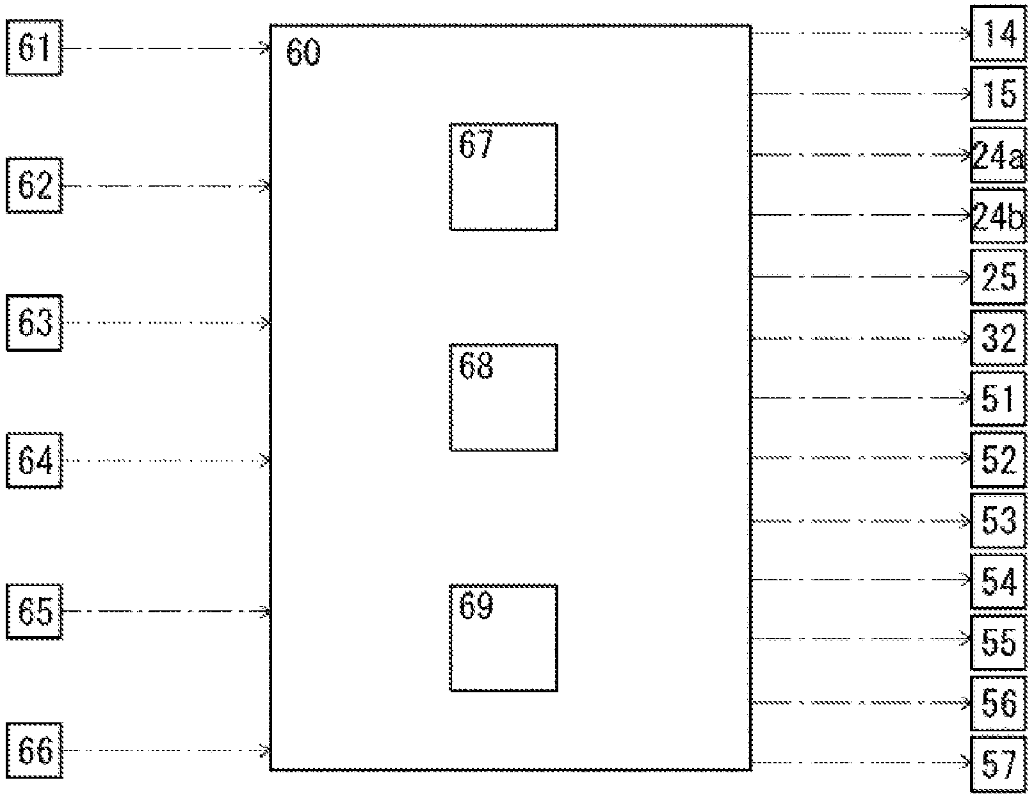
FIG. 6 is a block diagram illustrating a configuration of a control device in FIGS. 1 to 5.

As illustrated in FIG. 6, the control device 60 is hardware including a central processing unit (CPU) that executes various information processes, an internal storage device capable of reading and writing programs used for executing the various information processes and information processing results, and various interfaces, and the like. The control device 60 controls the battery temperature adjustment circuit 10, the cooling circuit 20, the heating circuit 30, and the flow path switching device 50 based on values acquired by the devices 61 to 66.

The ambient temperature acquisition device 61 includes a temperature sensor that acquires the ambient temperature Ta. The battery temperature acquisition device 62 includes a temperature sensor that acquires the battery temperature Tb. The stored water temperature acquisition device 63 includes a temperature sensor that acquires a stored water temperature Tw, which is the temperature of the coolant stored in the vacuum insulation tank 40. The room temperature acquisition device 64 includes a temperature sensor that acquires a room temperature Tr which is a temperature inside the vehicle compartment of the vehicle. The electric power amount acquisition device 65 includes a sensor that acquires an amount of electric power, which is a total amount of electric power output from the battery 2 or a total amount of electric power charging the battery 2.

The various acquisition devices are not limited to sensors that directly measure a temperature and electric power of an object, and may be devices that estimate the temperature of the object based on other measurement values. For example, the ambient temperature acquisition device 61 may be a device that estimates the ambient temperature Ta based on the temperature of the coolant in the battery temperature adjustment circuit 10 or the heating circuit 30 during stop of the vehicle. The battery temperature acquisition device 62 may be a device that estimates the battery temperature Tb based on the ambient temperature Ta and the input or output amount of the electric power in the battery 2. The electric power amount acquisition device 65 may be a device that estimates an amount of the electric power in the battery 2 based on a drive status of a device that is electrically connected to the battery 2 and drives by consuming the electric power in the battery 2.

The required temperature setting device 66 is a device that inputs a required temperature Td desired by an occupant of the vehicle such as a driver or a passenger, and is incorporated in an instrument panel installed in the vehicle compartment. The required temperature setting device 66 is operated by the occupant to input whether the cooling circuit 20 or the heating circuit 30 is driven and the required temperature Td.

The control device 60 includes a battery control unit 67, a room temperature control unit 68, and a water storage or discharge control unit 69 as functional elements. Each functional element is stored in the internal storage device as a program, and is executed by the central processing unit as appropriate. Each functional element may be implemented by a programmable controller (PLC) or an electric circuit that functions independently of the program.

The battery control unit 67 is a functional element that controls the battery temperature adjustment circuit 10 based on the battery temperature Tb to control battery temperature adjustment in which the battery temperature Tb is kept within a temperature range T1 to Th. The room temperature control unit 68 is a functional element that controls the cooling circuit 20 and the heating circuit 30 based on the room temperature Tr and the required temperature Td to control room temperature adjustment in which the room temperature Tr reaches the required temperature Td. The water storage or discharge control unit 69 is a functional element that controls water storage of the vacuum insulation tank 40 based on the ambient temperature Ta during charging of the battery 2 from the external power supply. The water storage or discharge control unit 69 is a functional element that controls the battery temperature adjustment circuit 10 instead of the battery control unit 67 and controls the cooling circuit 20 and the heating circuit 30 instead of the room temperature control unit 68 when the cold water or the hot water is stored in the vacuum insulation tank 40. In addition, the water storage or discharge control unit 69 is a functional element that controls the battery temperature adjustment instead of the battery control unit 67 and controls the room temperature adjustment instead of the room temperature control unit 68 when storing water in the vacuum insulation tank 40 or discharging water from the vacuum insulation tank 40.

A control right for the battery temperature adjustment is mainly held by the battery control unit 67. When the ambient temperature Ta during charging of the battery 2 from the external power supply exceeds a first threshold T1 to be described later, the control right is transferred from the battery control unit 67 to the water storage or discharge control unit 69. The control right is also transferred from the battery control unit 67 to the water storage or discharge control unit 69 at the time of input or output of electric power in the battery 2 in a state in which the cold water or the hot water is stored in the vacuum insulation tank 40.

A control right for the room temperature adjustment is mainly held by the room temperature control unit 68. When the battery control unit 67 uses an energy source, the battery control unit 67 issues an instruction to operate a circuit, and controls an operation of the circuit based on the instruction. When the ambient temperature Ta during charging of the battery 2 from the external power supply falls below a second threshold T2 to be described later, the control right is transferred from the battery control unit 67 to the water storage or discharge control unit 69. The control right is transferred from the room temperature control unit 68 to the water storage or discharge control unit 69 after the control right for the battery temperature Tb is transferred to the battery control unit 67 in a state in which the cold water or the hot water is stored in the vacuum insulation tank 40.

Figure 8:
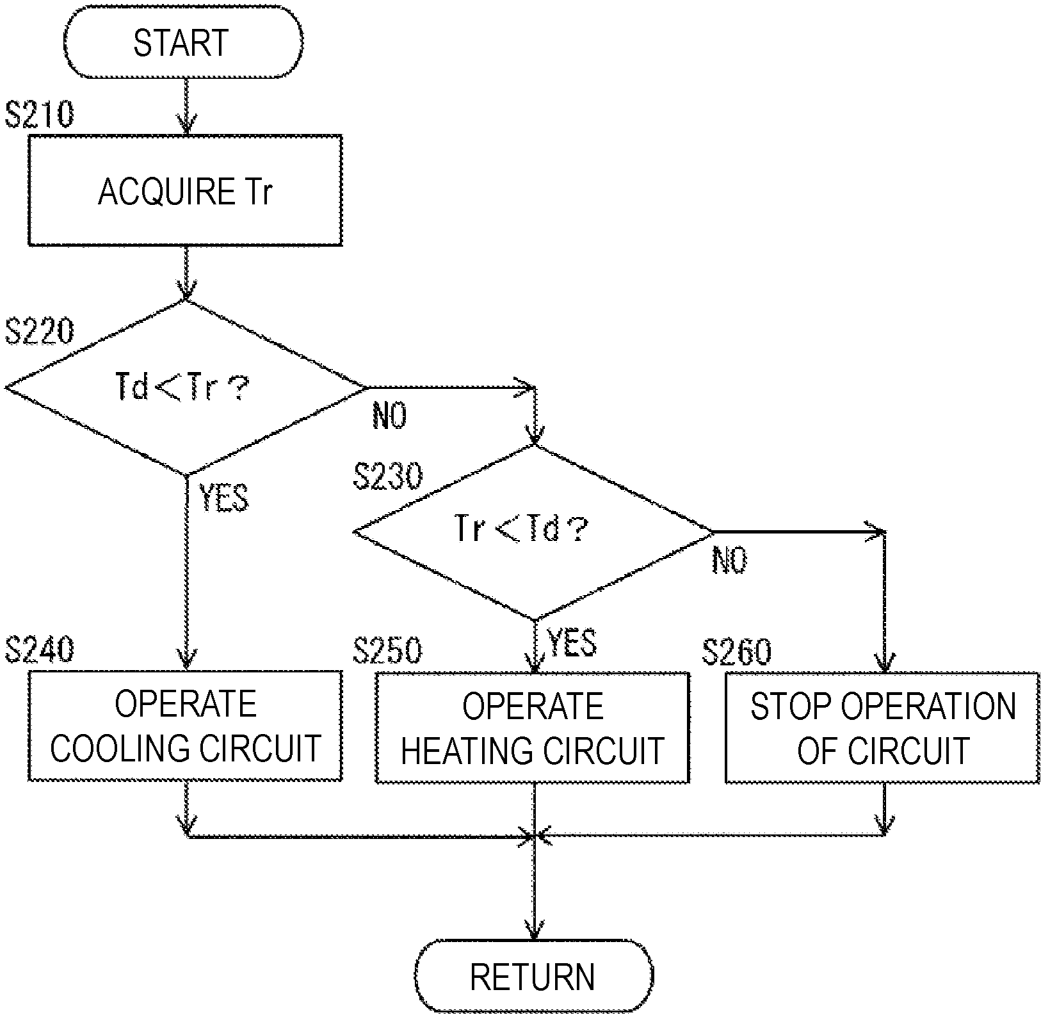
FIG. 8 is a flowchart illustrating a control method of adjusting a room temperature by the temperature adjustment mechanism in FIGS. 1 to 5.
Figure 9:
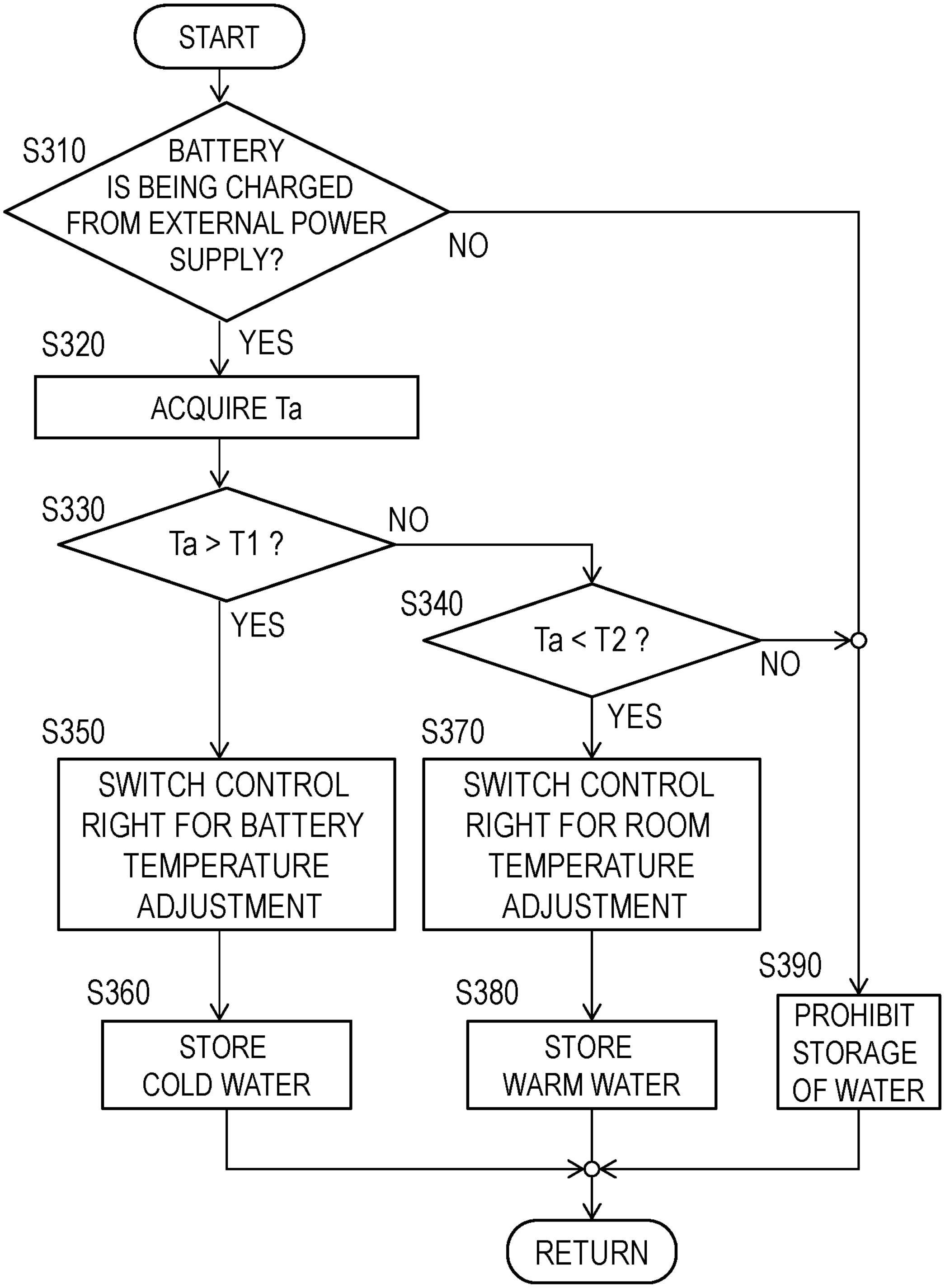
FIG. 9 is a flowchart illustrating a method of storing water in the vacuum insulation tank during charging of the battery from the external power supply by the temperature adjustment mechanism in FIGS. 1 and 2.
Figure 10:
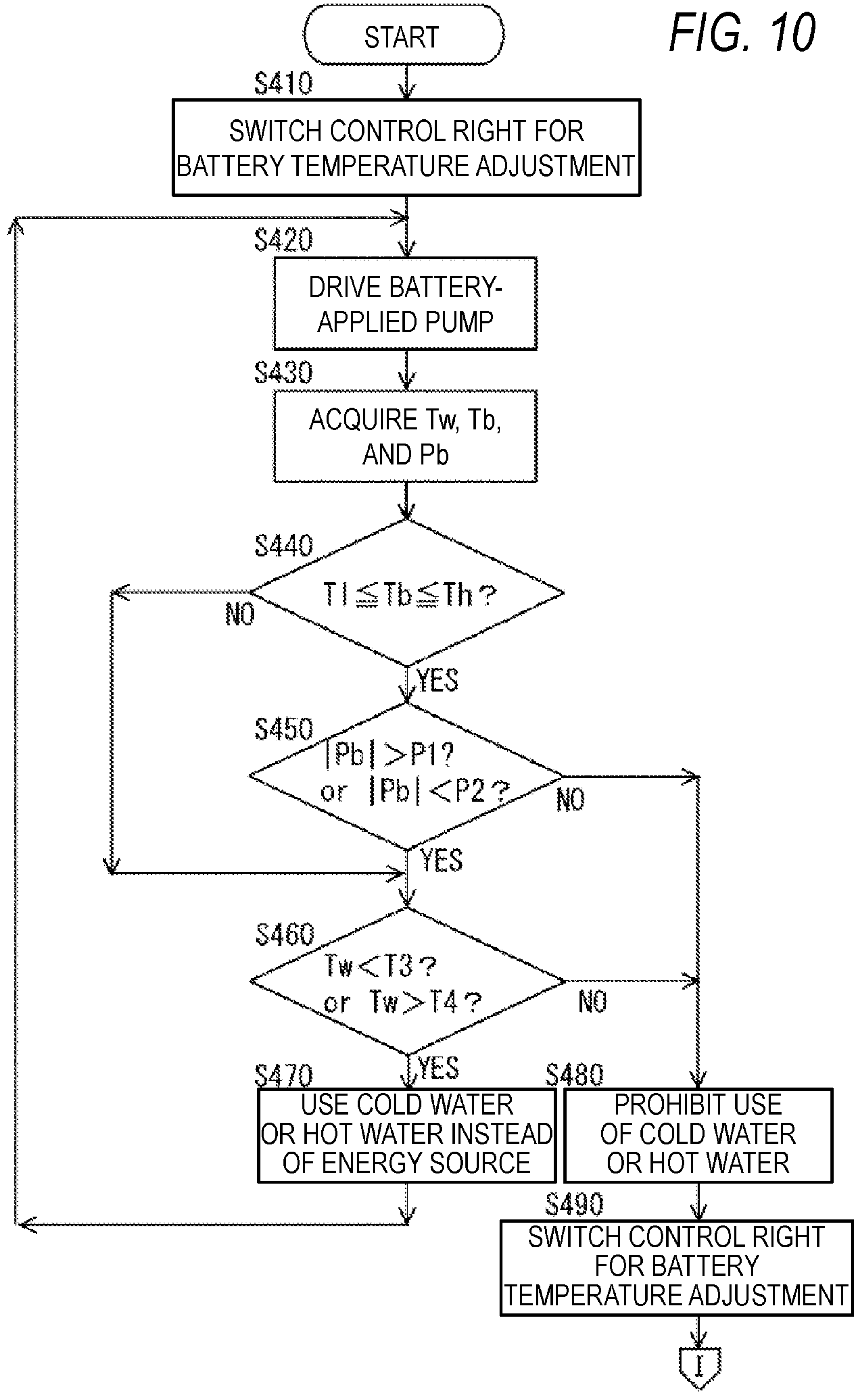
FIG. 10 is a flowchart illustrating a method of using, by the temperature adjustment mechanism in FIGS. 3 and 5, the cold water or the hot water stored in the vacuum insulation tank in the battery temperature adjustment circuit at the time of input and output of electric power in the battery.
Figure 11:
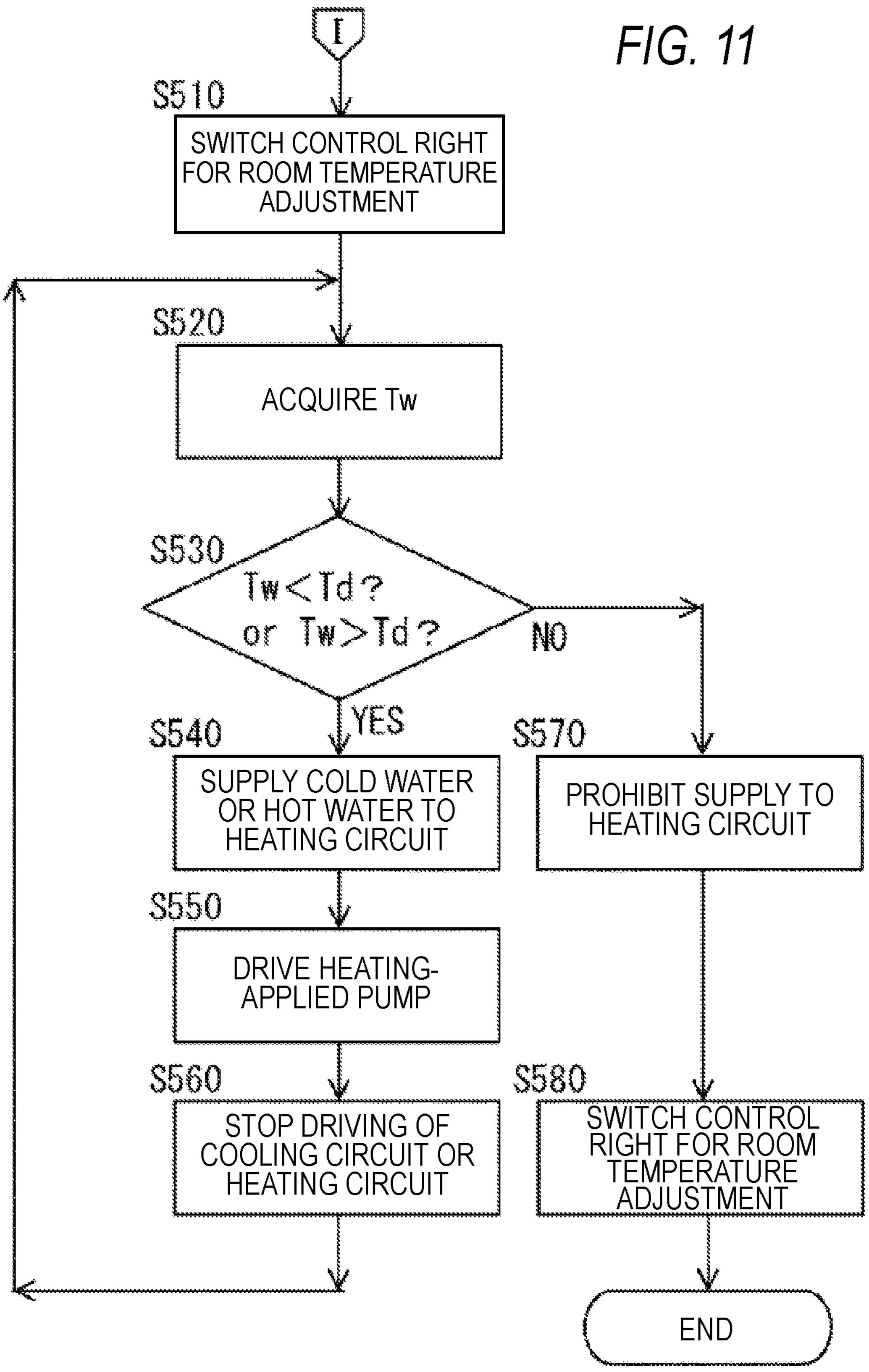
FIG. 11 is a flowchart illustrating a method of using, by the temperature adjustment mechanism in FIGS. 4 and 5, the cold water or the hot water stored in the vacuum insulation tank for room temperature adjustment at the time of input and output of electric power in the battery.

As illustrated in FIGS. 7 to 11, a control method for the temperature adjustment mechanism 10 includes a method of adjusting the battery temperature Tb by the battery control unit 67 (FIG. 7), a method of adjusting the room temperature Tr by the room temperature control unit 68 (FIG. 8), a method of storing water in the vacuum insulation tank 40 by the water storage or discharge control unit 69 (FIG. 9), and a method of using the cold water or the hot water stored in the vacuum insulation tank 40 (FIGS. 10 and 11). Each control method is repeatedly performed at a predetermined cycle. The predetermined cycle is a cycle in which each acquisition device acquires an acquired value. The progress of one cycle in the flowchart is indicated by "return".

Figure 7:
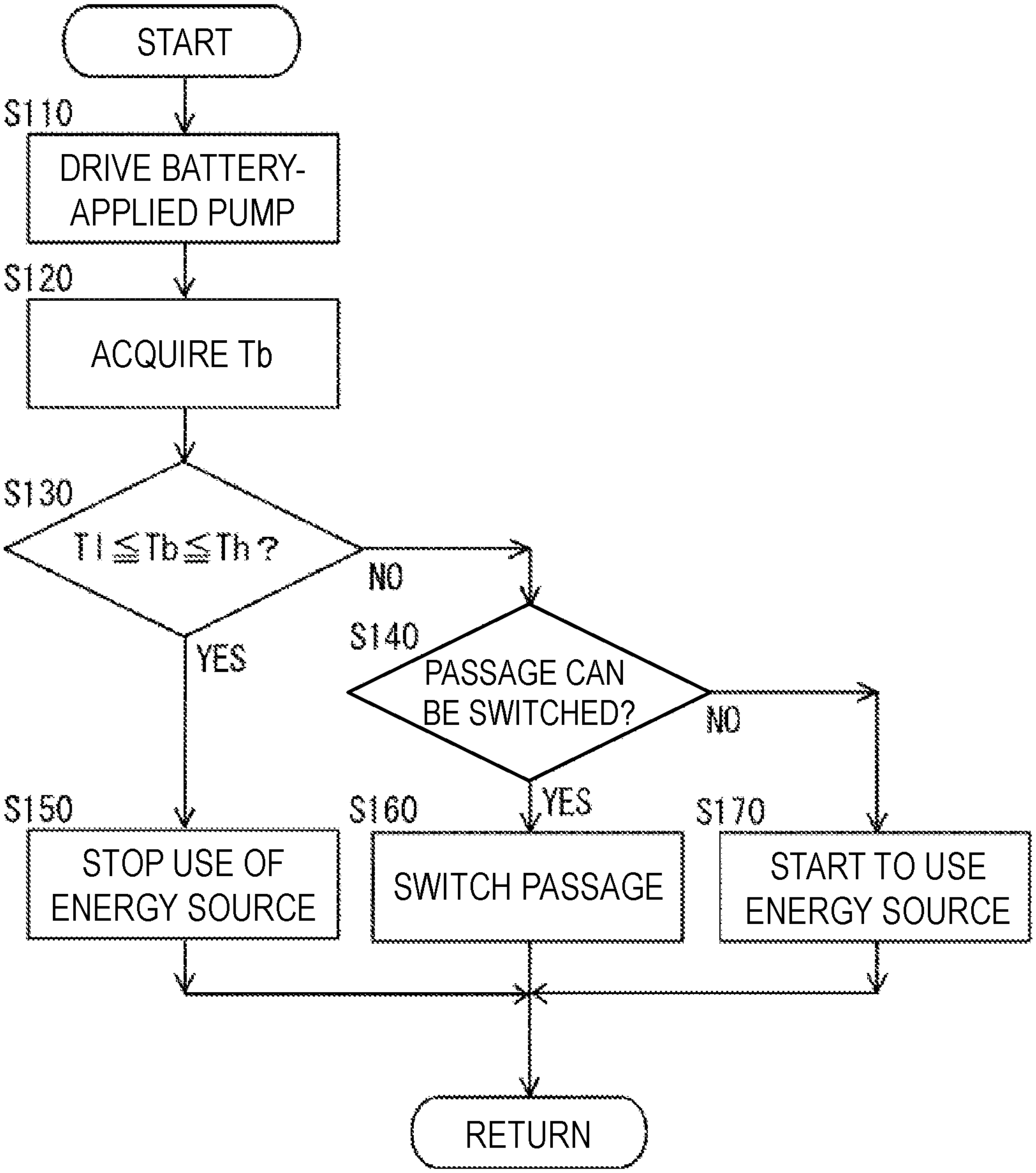
FIG. 7 is a flowchart illustrating a control method of adjusting a battery temperature by the temperature adjustment mechanism in FIGS. 1 to 5.

As illustrated in FIG. 7, the method of adjusting the battery temperature Tb is started when the electric power is input from or output to the battery 2, and is repeatedly performed at a predetermined cycle until the electric power is not input from or output to the battery 2. This method is performed by the battery control unit 67 except during charging of the battery 2 from the external power supply and when the cold water or the hot water is stored in the vacuum insulation tank 40.

When the electric power is input from or output to the battery 2, the battery control unit 67 drives the battery-applied pump 15 by the electric power in the battery 2 (S110). Next, the battery control unit 67 acquires the battery temperature Tb via the battery temperature acquisition device 62 (S120). Next, the battery control unit 67 determines whether the acquired battery temperature Tb is kept within a preset temperature range. In the present disclosure, the battery temperature Tb falling within the temperature range includes the battery temperature Tb being equal to the lower limit T1 or the upper limit Th.

When it is determined that the battery temperature Tb is kept within the temperature range (S120: YES), the use of the energy source is stopped (S150). When it is determined that the battery temperature Tb is out of the temperature range (S120: NO), the battery control unit 67 determines whether the temperature can be adjusted by switching the passage (S140). For example, when the battery temperature Tb exceeds the upper limit Th in a state in which the passage is switched to the cooling passage 12, or when the battery temperature Tb falls below the lower limit T1 in a state in which the passage is switched to the bypass passage 13, it is determined that the passage cannot be switched. On the other hand, when the battery temperature Tb exceeds the upper limit Th in the state in which the passage is switched to the bypass passage 13 or when the battery temperature Tb falls below the lower limit T1 in the state in which the passage is switched to the cooling passage 12, it is determined that the passage can be switched.

When it is determined that the passage can be switched (S140: YES), the battery control unit 67 switches the passage to the battery-applied flow path switching device 14 (S160). When it is determined that the passage cannot be switched (S140: NO), the battery control unit 67 starts to use the energy source (S170). For example, when the battery temperature Tb exceeds the upper limit Th, the battery control unit 67 issues an instruction to operate the cooling circuit 20 to the room temperature control unit 68. Based on this instruction, the room temperature control unit 68 drives the electric compressor 25 of the cooling circuit 20 by the electric power in the battery 2, closes the first cooling-applied valve device 24*a*, opens the second cooling-applied valve device 24*b*, and guides the refrigerant to the refrigerant-applied heat exchanger 16. When the battery temperature Tb falls below the lower limit T1, the battery control unit 67 drives the battery-applied electric heater 17 by the electric power in the battery 2. By repeating the above control, the battery temperature Tb is kept within the appropriate temperature range T1 to Th, and deterioration due to the temperature of the battery 2 can be prevented.

As illustrated in FIG. 8, the method of adjusting the room temperature Tr to the required temperature Td desired by the occupant is started when the occupant operates the required temperature setting device 66, and is performed at a predetermined cycle until the required temperature setting device 66 is operated again or the vehicle stops and the electric power is cut off. This method is performed by the room temperature control unit 68 except when the cold water or the hot water is stored in the vacuum insulation tank 40.

When the required temperature Td is input by the required temperature setting device 66, the room temperature control unit 68 acquires the room temperature Tr via the room temperature acquisition device 64 (S220). Next, the room temperature control unit 68 compares the acquired room temperature Tr with the input required temperature Td (S220 and S230).

When the room temperature Tr is higher than the required temperature Td (S220: YES), the room temperature control unit 68 drives the electric compressor 25 by the electric power in the battery 2, operates the cooling circuit 20, and cools the room by cold air (S240). When the room temperature Tr is lower than the required temperature Td (S220: NO, S230: YES), the room temperature control unit 68 drives the heating-applied pump 32 and the heating-applied electric heater 33 by the electric power in the battery 2, operates the heating circuit 30, and heats the room with hot air (S250). When the room temperature Tr is equal to the required temperature Td (S220: NO, S230: NO), the room temperature control unit 68 stops driving the cooling circuit 20 and the heating circuit 30 that have been operated (S260). By repeating the above control, the room temperature Tr is adjusted to the required temperature Td desired by the occupant.

As illustrated in FIG. 9, a method of storing water in the vacuum insulation tank 40 is a method performed within a period in which the battery 2 is charged from the external power supply. This method is started when the charging of the battery 2 is started, and is performed at a predetermined cycle while the cold water or the hot water is stored in the vacuum insulation tank 40 at least in a period from the start of the charging of the battery 2 to the completion of the charging of the battery 2.

When the battery 2 is electrically connected to an external power supply (not shown) and charging is started, the battery control unit 67 controls the battery temperature Tb described above. The water storage or discharge control unit 69 determines whether the battery 2 is being charged from the external power supply (step S310). When it is determined that the battery 2 is being charged from the external power supply (S310: YES), the water storage or discharge control unit 69 acquires the ambient temperature Ta via the ambient temperature acquisition device 61 (S320). Next, the water storage or discharge control unit 69 performs temperature determination on the obtained ambient temperature Ta (S330, S340). In the temperature determination, the water storage or discharge control unit 69 determines three states, that is, a state in which the ambient temperature Ta exceeds the preset first threshold T1 (S330: YES), a state in which the ambient temperature Ta falls below the preset second threshold T2 (S340: YES), and a state in which the ambient temperature Ta is equal to or higher than the second threshold T2 and equal to or lower than the first threshold T1 (S330: NO, S340: NO).

In the present disclosure, the first threshold T1 is a value capable of determining a state in which the battery temperature Tb is higher than the upper limit Th of the appropriate temperature range by cooling only the coolant at the time of input or output of electric power in the battery 2, and the refrigerant by the operation of the cooling circuit 20 is frequently used. That is, the first threshold T1 is a value capable of determining a state in which cooling is frequently performed using the cold energy source that consumes energy at the time of input or output of electric power in the battery 2. The second threshold T2 is a value lower than the first threshold T1, and is a value capable of determining a state in which the battery temperature Tb is lower than the lower limit T1 of the temperature range at the time of input or output of electric power in the battery 2, and the battery-applied electric heater 17 is frequently driven. That is, the second threshold T2 is a value capable of determining a state in which heating is frequently performed using a hot energy source that generates energy at the time of input or output of electric power in the battery 2.

The state in which cooling is frequently performed using a cold energy source that consumes energy at the time of input or output of electric power in the battery 2 occurs in summer in Japan, and the state in which the heating is frequently performed using the hot energy source occurs in winter in Japan. Here, the first threshold T1 may be a value capable of determining summer in Japan, and the second threshold T2 may be a value capable of determining winter in Japan. For example, the first threshold T1 is an average temperature in a summer period, and the second threshold T2 is an average temperature in a winter period. Since the ambient temperature Ta varies between daytime and nighttime, different thresholds may be set according to different time zones, such as a threshold for daytime and a threshold for nighttime.

An opportunity to perform cooling using the cold energy source that consumes energy at the time of input or output of electric power in the battery 2 is when the battery temperature Tb exceeds the upper limit Th of the appropriate temperature range, and an opportunity to perform heating using the hot energy source is when the battery temperature Tb falls below the lower limit T1 of the appropriate temperature range. Here, the first threshold T1 may be set to the upper limit Th of the appropriate temperature range of the battery 2, and the second threshold T2 may be set to the lower limit T1 of the temperature range.

When it is determined that the ambient temperature Ta exceeds the first threshold T1 (S330: YES), the control right for the battery temperature adjustment is switched from the battery control unit 67 to the water storage or discharge control unit 69 (S350). Next, the water storage or discharge control unit 69 controls the battery temperature adjustment circuit 10, the cooling circuit 20, and the flow path switching device 50 to store, in the vacuum insulation tank 40, the cold water cooled by the refrigerant serving as the cold energy source in the refrigerant-applied heat exchanger 16 while keeping the battery temperature Tb within the temperature range T1 to Th (S360).

When it is determined that the ambient temperature Ta falls below the second threshold T2 (S340: YES), the control right for the room temperature adjustment is switched from the room temperature control unit 68 to the water storage or discharge control unit 69 (S370). Next, the water storage or discharge control unit 69 controls the heating circuit 30 and the flow path switching device 50 to store the hot water heated by the heating-applied electric heater 33 serving as the hot energy source in the vacuum insulation tank 40 (S380). When it is determined that the ambient temperature Ta is equal to or higher than the second threshold T2 and equal to or lower than the first threshold T1 (S330: NO, S340: NO), the control right is not switched to the water storage or discharge control unit 69, and the storage of the cold water or the hot water in the vacuum insulation tank 40 is prohibited (S390).

When the charging of the battery 2 from the external power supply is completed (S310: NO), the water storage or discharge control unit 69 stops the storage of water in the vacuum insulation tank 40 and returns the respective control rights to the battery control unit 67 and the room temperature control unit 68, the control units stop the respective devices, and the control method is completed. Water may be constantly stored in the vacuum insulation tank 40 during charging of the battery 2 from the external power supply, but water storage may be terminated based on the stored water temperature Tw acquired by the stored water temperature acquisition device 63. For example, when the stored water temperature Tw does not change even after a predetermined time elapses, or when the stored water temperature Tw reaches a preset threshold, the water storage may be terminated.

As illustrated in FIG. 1, in step S360, in the battery temperature adjustment circuit 10, the flow path of the coolant is switched to the bypass passage 13 by the battery-applied flow path switching device 14. In the cooling circuit 20, the electric compressor 25 is driven, the first cooling-applied valve device 24*a* blocks the cooling-applied passage 22, and the second cooling-applied valve device 24*b* opens the battery-applied passage 23. At this time, the driving of the subsequent electric fan in the evaporator 28 is stopped. Accordingly, in the battery temperature adjustment circuit 10, heat is exchanged between the refrigerant in the cooling circuit 20 and the coolant in the refrigerant-applied heat exchanger 16 to cool the coolant. Next, the first valve device 51 and the second valve device 52 are opened to open the first connection pipe 41 and the second connection pipe 42. Other valve devices other than the sixth valve device 56 are closed. Accordingly, in the vacuum insulation tank 40, the cold water cooled by the refrigerant in the refrigerant-applied heat exchanger 16 is injected, and the cold water is stored. At the same time, a flow rate of the cold water flowing into the battery 2 is adjusted by the sixth valve device 56, and the battery temperature Tb is adjusted.

When the ambient temperature Ta is higher than the first threshold T1, the water storage or discharge control unit 69 operates the cooling circuit 20 to give priority to storing the cold water in the vacuum insulation tank 40 even when the determination to stop the use of the energy source is made in a control flow illustrated in FIG. 7. The water storage or discharge control unit 69 prohibits the switching from the bypass passage 13 to the cooling passage 12 even when the passage is determined to be switched in the control flow illustrated in FIG. 7.

Figure 2:
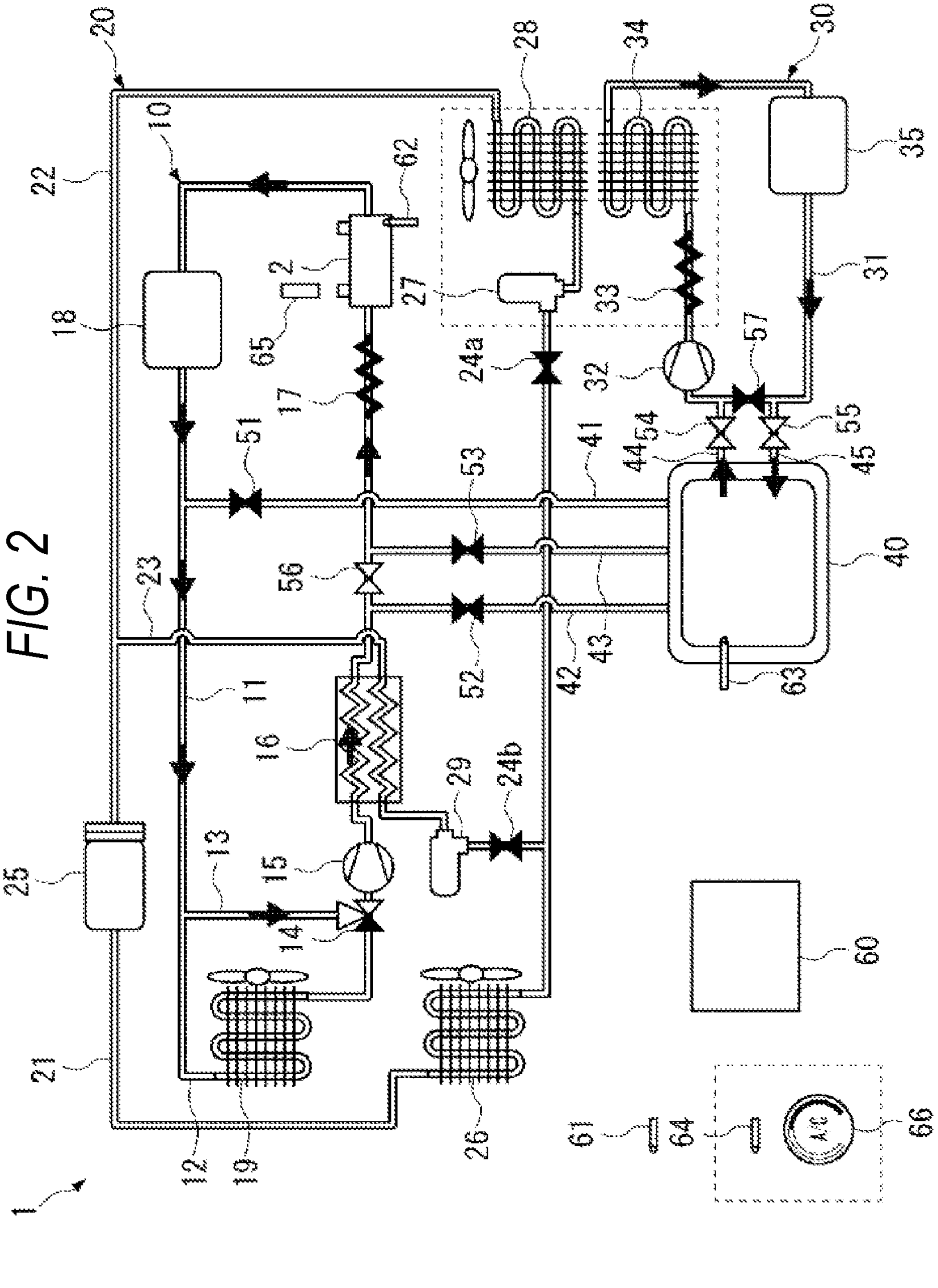
FIG. 2 is a configuration diagram illustrating the temperature adjustment mechanism according to the first embodiment, and illustrates a state in which hot water is stored in the vacuum insulation tank when the battery is charged from the external power supply.

As illustrated in FIG. 2, in step S380, in the battery temperature adjustment circuit 10, the flow path of the coolant is switched to the bypass passage 13 by the battery-applied flow path switching device 14, and the battery-applied electric heater 17 is driven to heat the coolant. Depending on the battery temperature Tb, in the battery temperature adjustment circuit 10, the flow path of the coolant may be switched to the cooling passage 12 by the battery-applied flow path switching device 14, and the battery 2 may be cooled by the air-cooled coolant. In the heating circuit 30, the heating-applied pump 32 is driven, and the heating-applied electric heater 33 is driven. At this time, the driving of the electric fan that blows air to the heating-applied heat exchanger 34 following the evaporator 28 is stopped. Accordingly, in the heating circuit 30, the coolant is heated by the heating-applied electric heater 33. Next, the fourth valve device 54 and the fifth valve device 55 are opened to open the fourth connection pipe 44 and the fifth connection pipe 45. Other valve devices are closed. Accordingly, in the vacuum insulation tank 40, the hot water heated by the heating-applied electric heater 33 is injected, and the hot water is stored.

When the ambient temperature Ta is lower than the second threshold T2, the battery temperature adjustment circuit 10 and the vacuum insulation tank 40 connected to the heating circuit 30 are circuits independent of each other, and even when the hot water is stored in the vacuum insulation tank 40, the battery temperature adjustment circuit 10 is not influenced at all. When the ambient temperature Ta is lower than the second threshold T2, the control right for the battery temperature adjustment is held by the battery control unit 67.

As illustrated in FIG. 10, a method of using the cold water stored in the vacuum insulation tank 40 at the time of input or output of electric power in the battery 2 excluding a charge from the external power supply is started after input or output of the electric power from or to the battery 2 is started. This method is performed until the battery temperature adjustment by the supply of the cold water or the hot water stored in the vacuum insulation tank 40 comes to be unnecessary or impossible to be performed. In the following flowchart, it is assumed that the required temperature setting device 66 is operated by the occupant, and the required temperature Td is lower than the room temperature Tr, or the required temperature Td is higher than the room temperature Tr.

When the electric power in the battery 2 is input or output in a state in which the cold water or the hot water is stored in the vacuum insulation tank 40, the control right for the battery temperature adjustment illustrated in FIG. 7 is switched from the battery control unit 67 to the water storage or discharge control unit 69 (S410). At this time, the control right for the room temperature adjustment is held by the room temperature control unit 68, and the room temperature control unit 68 operates the cooling circuit 20 based on the input required temperature Td and the acquired room temperature Tr. Next, the water storage or discharge control unit 69 drives the battery-applied pump 15 by the electric power in the battery 2 (S420). Next, the water storage or discharge control unit 69 acquires the stored water temperature Tw via the stored water temperature acquisition device 63, acquires the battery temperature Tb via the battery temperature acquisition device 62, and acquires an amount of electric power Pb via the electric power amount acquisition device 65 (S430).

Next, the water storage or discharge control unit 69 determines whether the adjustment of the battery temperature Tb by the supply of the cold water or the hot water stored in the vacuum insulation tank 40 is unnecessary or impossible to be performed (S440, S450, and S460). Specifically, the water storage or discharge control unit 69 determines whether the acquired battery temperature Tb is kept within an appropriate temperature range (S440)). The water storage or discharge control unit 69 determines whether an absolute value of the acquired amount of electric power Pb exceeds a preset first load threshold P1 when the cold water is stored in the vacuum insulation tank 40, and determines whether the absolute value of the amount of electric power Pb falls below a preset second load threshold P2 when the hot water is stored in the vacuum insulation tank 40) (S450)). By these two determinations, it is determined whether the battery temperature adjustment by the cold water or the hot water is unnecessary. In addition, the water storage or discharge control unit 69 determines whether the acquired stored water temperature Tw is lower than a preset third threshold T3 when the cold water is stored in the vacuum insulation tank 40, or whether the acquired stored water temperature Tw is higher than a preset fourth threshold T4 when the hot water is stored in the vacuum insulation tank 40) (S460). By this determination, it is determined whether the battery temperature adjustment by the cold water or the hot water is impossible to be performed.

In the present disclosure, the first load threshold P1 is a threshold obtained when the cold water is stored in the vacuum insulation tank 40. The first load threshold P1 is a value capable of determining a state in which an electric power load of the battery 2 is large, a rate of increase in the battery temperature Tb is high, and maintaining the battery temperature Tb in an appropriate temperature range is impossible in the air-cooled heat exchanger 19 of the cooling passage 12 in the battery temperature adjustment circuit 10. It is exemplified that, for example, when the absolute value of the amount of electric power Pb exceeds the first load threshold P1, immediately after the vehicle starts traveling, the vehicle is traveling on a steep uphill road or downhill road. The second load threshold P2 is a threshold obtained when the hot water is stored in the vacuum insulation tank 40. The second load threshold P2 is a value capable of determining a state in which the electric power load of the battery 2 is small, the rate of increase in the battery temperature Tb is low; and maintaining the battery temperature Tb in the appropriate temperature range is impossible in a state in which the flow path is switched to the bypass passage 13 in the battery temperature adjustment circuit 10. It is exemplified that, for example, when the absolute value of the amount of electric power Pb falls below the second load threshold P2, the vehicle is traveling on a congested road or traveling on a gentle downhill road. The amount of electric power Pb is positive for the amount of electric power output from the battery 2 and negative for the amount of electric power charged in the battery 2.

The third threshold T3 is a value capable of determining a state in which the cold water stored in the vacuum insulation tank 40 can sufficiently cool the battery 2 instead of the cold energy source. For example, the lower limit T1 of the appropriate temperature range of the battery 2 is exemplified as the third threshold T3. Further, the temperature of the coolant when the flow path of the battery temperature adjustment circuit 10 is switched to the cooling passage 12 is also exemplified as the third threshold T3. The fourth threshold T4 is a value capable of determining a state in which the hot water stored in the vacuum insulation tank 40 can sufficiently heat the battery 2 instead of the hot energy source. For example, the upper limit Th of the appropriate temperature range of the battery 2 is exemplified as the fourth threshold T4. In addition, the temperature of the coolant when the flow path of the battery temperature adjustment circuit 10 is switched to the bypass passage 13 is also exemplified as the fourth threshold T4.

When the battery temperature adjustment is necessary and possible (S440: NO, S450: YES, and S460: YES), the water storage or discharge control unit 69 controls the flow path switching device 50 to use the cold water or the hot water stored in the vacuum insulation tank 40 instead of the cold energy source or the hot energy source of the battery temperature adjustment circuit 10 (S470). After this step, in step S170 illustrated in FIG. 7, the cold water or the hot water stored in the vacuum insulation tank 40 is used instead of the energy source.

When the adjustment for the battery temperature Tb is unnecessary or impossible to be performed (S440: YES, S450: NO, or S460: NO), the water storage or discharge control unit 69 prohibits subsequent use of the cold water stored in the vacuum insulation tank 40 thereafter (S480). Next, the control right for the battery temperature adjustment is switched from the water storage or discharge control unit 69 to the battery control unit 67 (S490), and the battery control unit 67 performs the subsequent adjustment of the battery temperature Tb based on the control flow illustrated in FIG. 7.

Figure 3:
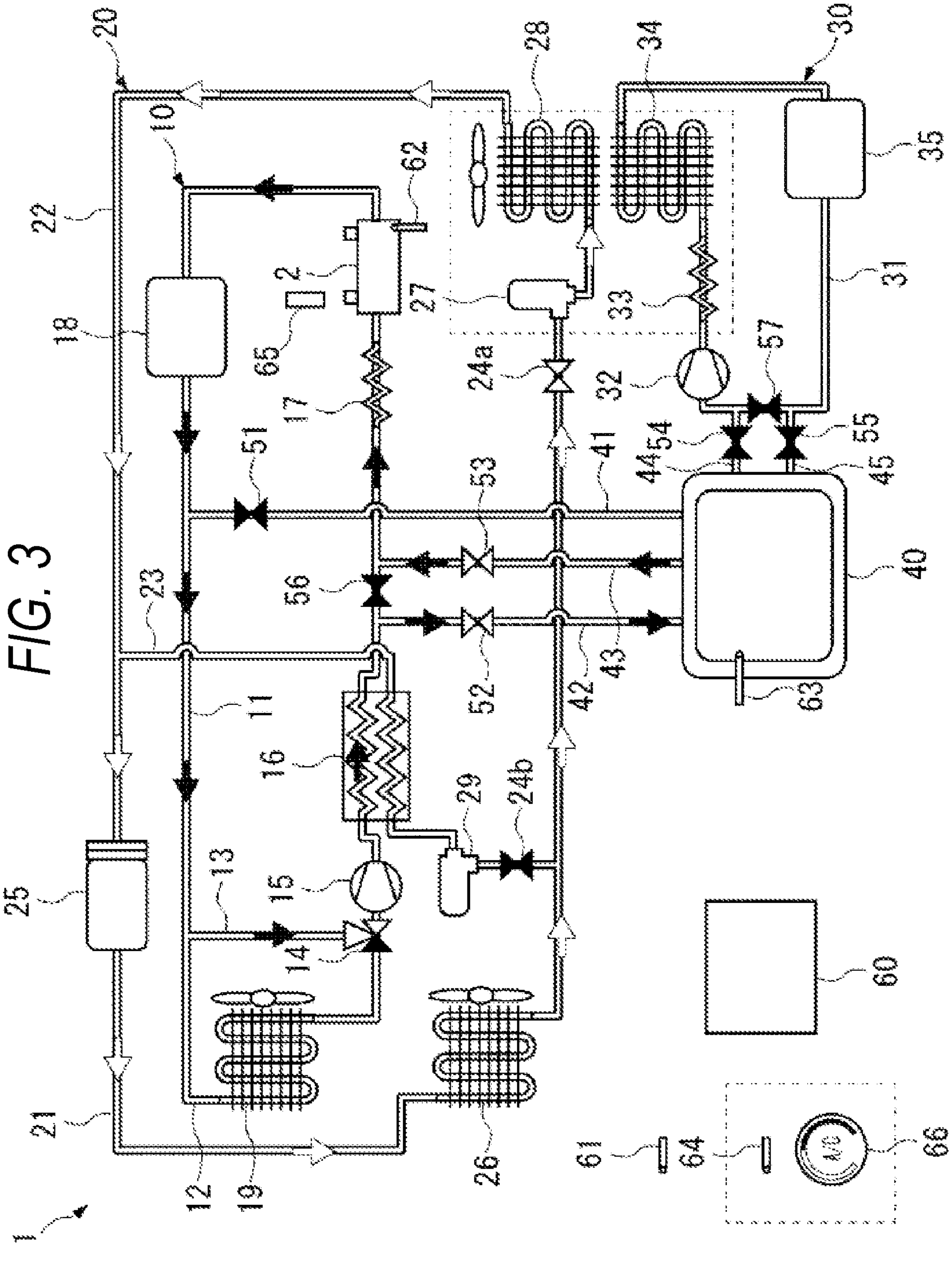
FIG. 3 is a configuration diagram illustrating the temperature adjustment mechanism according to the first embodiment, and illustrates a state in which the cold water is used in a battery temperature adjustment circuit at the time of input and output of electric power in the battery excluding a charge from the external power supply.

As illustrated in FIG. 3, when the cold water is stored in the vacuum insulation tank 40, in step S470, the flow path of the coolant is switched to the bypass passage 13 by the battery-applied flow path switching device 14 in the battery temperature adjustment circuit 10. Next, the second valve device 52 and the third valve device 53 are opened to open the second connection pipe 42 and the third connection pipe 43. Other valve devices are closed. Accordingly, the cold water stored in the vacuum insulation tank 40 is supplied to the battery temperature adjustment circuit 10 by driving the battery-applied pump 15, and the battery temperature Tb is adjusted. At this time, since the control right for the room temperature adjustment is held by the room temperature control unit 68, the room temperature control unit 68 adjusts the room temperature Tr to the required temperature Td by a control flow illustrated in FIG. 8. When the room temperature Tr is higher than the required temperature Td, the cooling circuit 20 operates to blow cold air.

Figure 4:
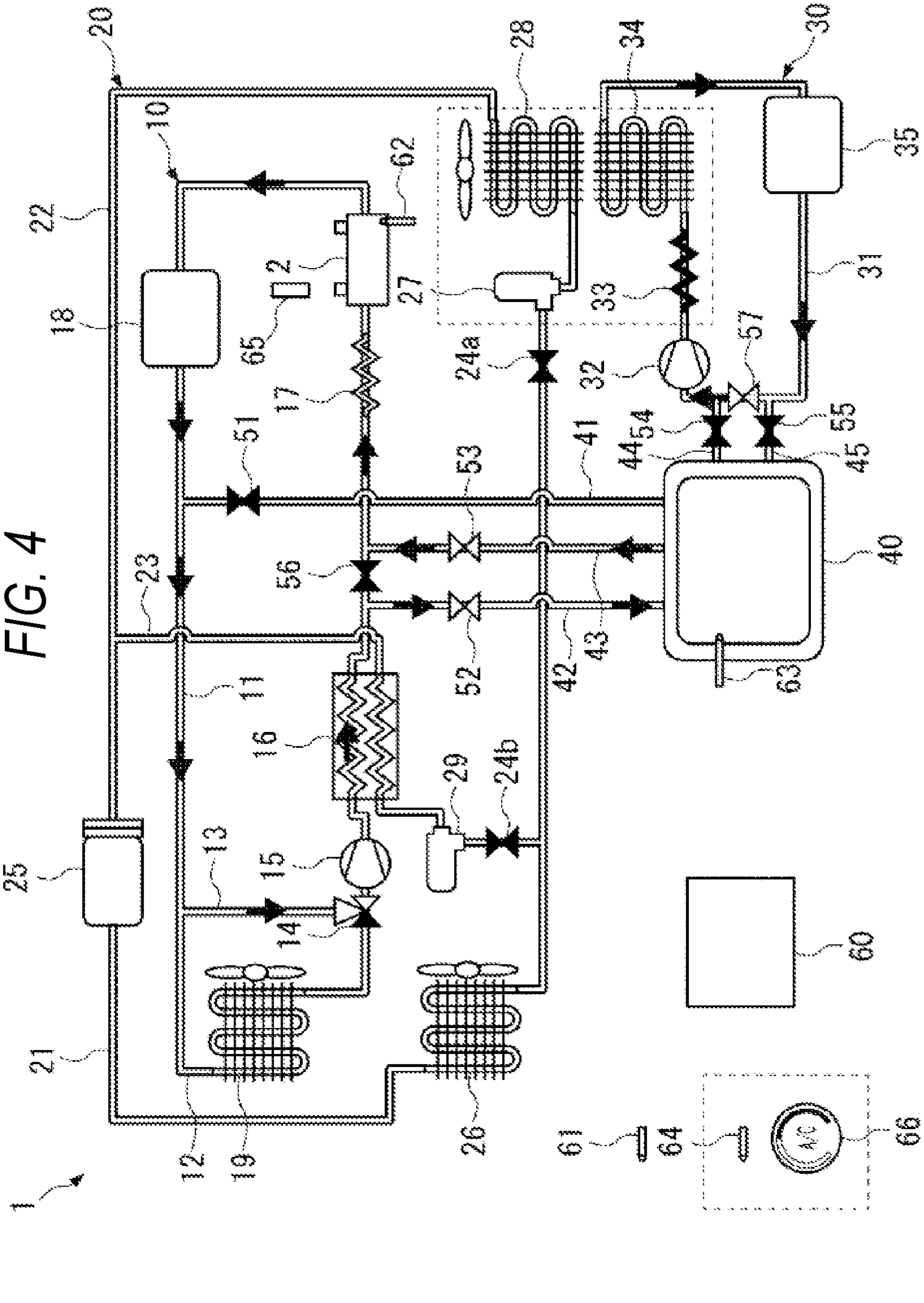
FIG. 4 is a configuration diagram illustrating the temperature adjustment mechanism according to the first embodiment, and illustrates a state in which the hot water is used in a battery temperature adjustment circuit at the time of input and output of electric power in the battery excluding the charge from the external power supply.

As illustrated in FIG. 4, when the hot water is stored in the vacuum insulation tank 40, in step S470, the flow path of the coolant is switched to the bypass passage 13 by the battery-applied flow path switching device 14 in the battery temperature adjustment circuit 10. Next, the second valve device 52 and the third valve device 53 are opened to open the second connection pipe 42 and the third connection pipe 43. Other valve devices are closed. Accordingly, the hot water stored in the vacuum insulation tank 40 is supplied to the battery temperature adjustment circuit 10 by driving the battery-applied pump 15, and the battery temperature Tb is adjusted. At this time, since the control right for the room temperature adjustment is held by the room temperature control unit 68, the room temperature control unit 68 adjusts the room temperature Tr to the required temperature Td by a control flow illustrated in FIG. 8. When the room temperature Tr is lower than the required temperature Td, the heating circuit 30 operates to blow hot air.

As illustrated in FIG. 11, the control right for room temperature adjustment is switched from the room temperature control unit 68 to the water storage or discharge control unit 69 (S510). Next, the water storage or discharge control unit 69 acquires the stored water temperature Tw via the stored water temperature acquisition device 63 (S520). Next, the water storage or discharge control unit 69 determines whether the stored water temperature Tw of the cold water is lower than the required temperature Td or whether the stored water temperature Tw of the hot water is higher than the required temperature Td (S530).

When it is determined that the stored water temperature Tw of the cold water is lower than the required temperature Td or the stored water temperature Tw of the hot water is higher than the required temperature Td (S530: YES), the water storage or discharge control unit 69 controls the flow path switching device 50 to supply the cold water or the hot water stored in the vacuum insulation tank 40 to the heating circuit 30 (S540). Next, the water storage or discharge control unit 69 drives the heating-applied pump 32 by the electric power in the battery 2 (S550). Next, the water storage or discharge control unit 69 stops the driving of the electric compressor 25 of the cooling circuit 20 to stop the operation of the cooling circuit 20, or stops the driving of the heating-applied electric heater 33 to stop the operation of the heating circuit 30 (S560). Stopping the operation of the heating circuit 30 means stopping the operation of the heating circuit 30 for blowing hot air by driving the heating-applied electric heater 33.

Figure 5:
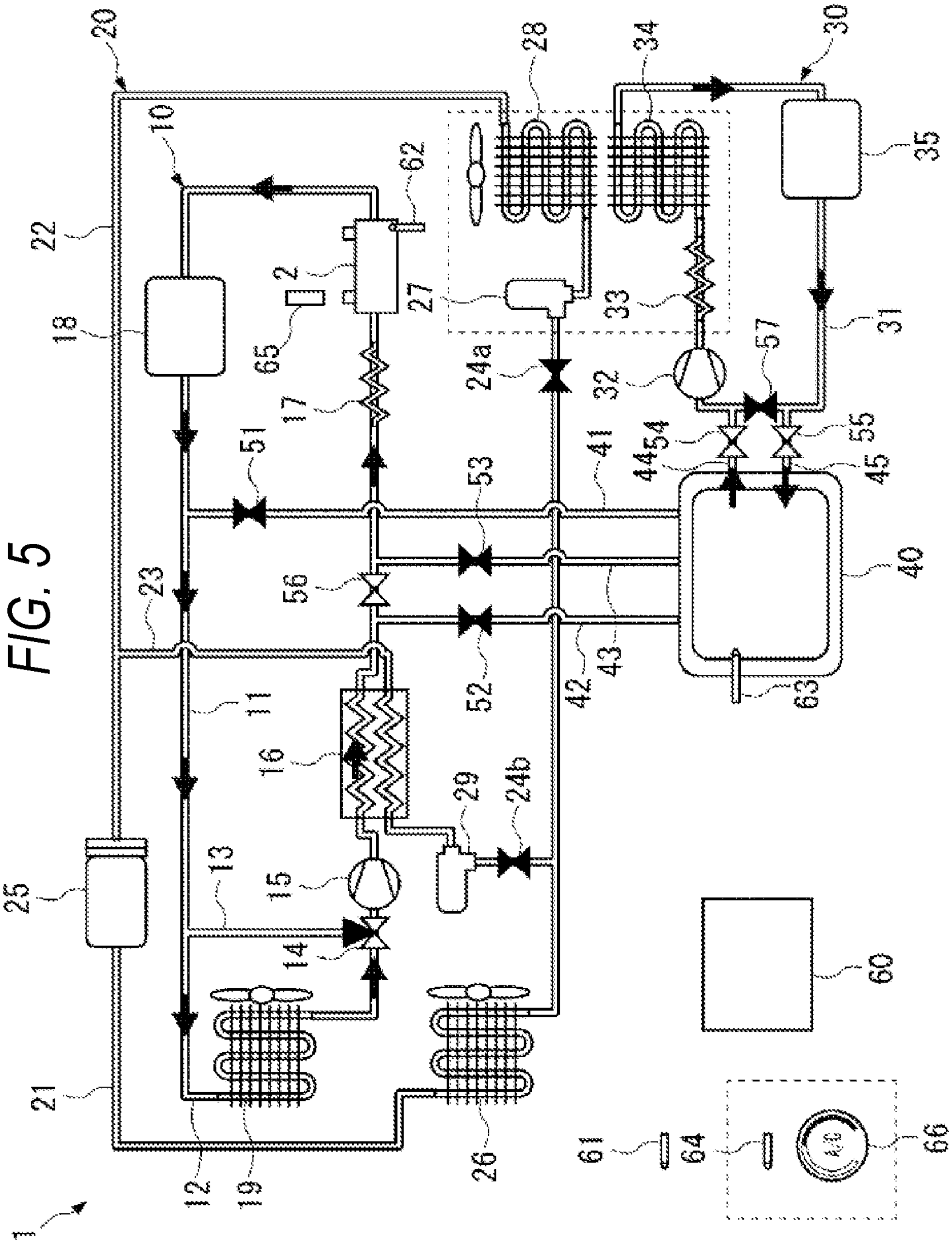
FIG. 5 is a configuration diagram illustrating the temperature adjustment mechanism according to the first embodiment, and illustrates a state in which the cold water or the hot water is used for room temperature adjustment at the time of input and output of electric power in the battery excluding the charge from the external power supply.

As illustrated in FIG. 5, when the cold water is stored in the vacuum insulation tank 40, in Steps S540 to S560, the operation of the cooling circuit 20 is stopped, and the fourth valve device 54 and the fifth valve device 55 are opened to open the fourth connection pipe 44 and the fifth connection pipe 45. Other valve devices are closed. Accordingly, the cold water stored in the vacuum insulation tank 40 is supplied to the heating circuit 30 by driving the heating-applied pump 32. Next, heat is exchanged between the air blown by the subsequent electric fan in the evaporator 28 and the cold water by the heating-applied heat exchanger 34, and the blown air is cooled by the cold water. Next, the room temperature Tr is adjusted by the blown cold air. At this time, since the control right for the battery temperature Tb is held by the battery control unit 67, and the battery control unit 67 adjusts the battery temperature Tb by the control flow illustrated in FIG. 7.

When the hot water is stored in the vacuum insulation tank 40, in steps S540 to S560, the driving of the heating-applied electric heater 33 of the heating circuit 30 is stopped, the fourth valve device 54 and the fifth valve device 55 are opened to open the fourth connection pipe 44 and the fifth connection pipe 45. Other valve devices are closed. Accordingly, the hot water stored in the vacuum insulation tank 40 is supplied to the heating circuit 30 by driving the heating-applied pump 32. Next, heat is exchanged between the air blown by the subsequent electric fan in the evaporator 28 and the hot water by the heating-applied heat exchanger 34, and the blown air is heated by the hot water. Next, the room temperature Tr is adjusted by the blown hot air. At this time, since the control right for the battery temperature Tb is held by the battery control unit 67, and the battery control unit 67 adjusts the battery temperature Tb by the control flow illustrated in FIG. 7.

As described above, the temperature adjustment mechanism 1 according to the first embodiment consumes energy in a situation where electric power may be consumed during charging of the battery 2 from the external power supply to store the cold water or the hot water in the vacuum insulation tank 40, and uses the cold water or the hot water stored in the vacuum insulation tank 40 for battery temperature adjustment at the time of input or output of electric power in the battery 2 excluding a charge from the external power supply. Therefore, according to the temperature adjustment mechanism 1, the battery temperature adjustment can be performed only by consuming the electric power in the battery-applied pump 15 at the time of input and output of electric power in the battery 2 excluding a charge from the external power supply, and electric power consumption required to extend life of the battery 2 can be reduced. Accordingly, it is possible to reduce the decrease in a charge amount of the battery 2 and extend a cruising distance of the vehicle while extending the life of the battery 2.

The temperature adjustment mechanism 1 mainly uses the cold water or the hot water stored in the vacuum insulation tank 40 for the battery temperature adjustment, and additionally uses the cold water or the hot water for the room temperature adjustment. When the use of the cold water or the hot water is unnecessary for the battery temperature adjustment or when the battery temperature adjustment by the cold water or the hot water is impossible to be performed, the temperature adjustment mechanism 1 supplies the cold water or the hot water to a heat exchanger installed in the vehicle compartment and uses the cold water or the hot water for the room temperature adjustment in the vehicle compartment. Therefore, according to the temperature adjustment mechanism 10, the room temperature can be adjusted only by consumption of electric power from a pump that sends cold water or the hot water to the heat exchanger, and the electric power consumption required for the room temperature adjustment can be reduced. Accordingly, it is possible to reduce the decrease in the charge amount of the battery 2 and extend the cruising distance of the vehicle. In addition, by using pre-cooled cold water or pre-heated hot water, an effect of air conditioning is improved, and the vehicle compartment can be cooled or warmed earlier than using the cooling circuit 20 or the heating circuit 30.

Figure 12:
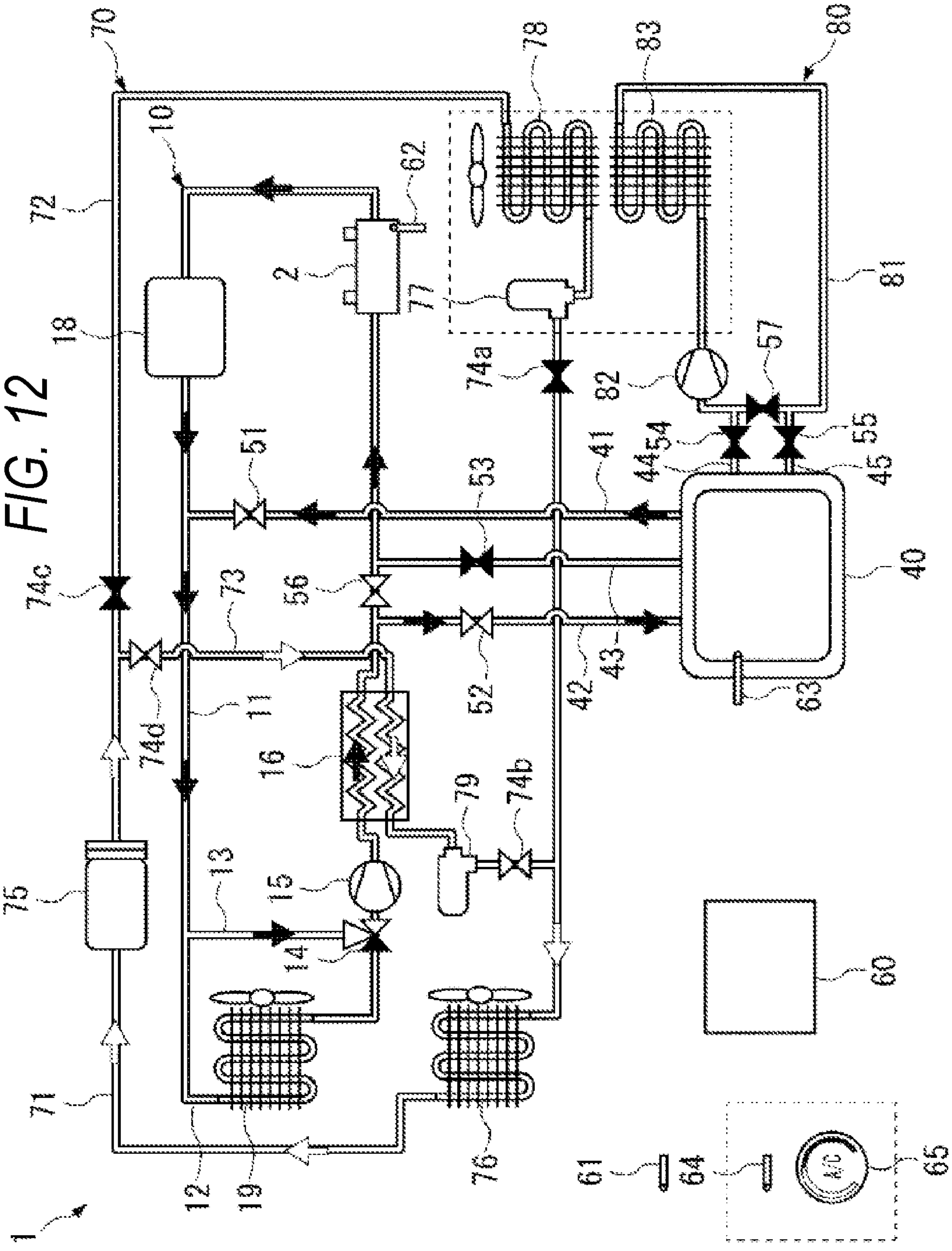
FIG. 12 is a configuration diagram illustrating a temperature adjustment mechanism according to a second embodiment, and illustrates a state in which hot water is stored in a vacuum insulation tank when a battery is charged from an external power supply.

As illustrated in FIG. 12, the temperature adjustment mechanism 10 according to the second embodiment is different from that of the first embodiment in that the temperature adjustment mechanism 10 includes a heat-pump type air conditioning circuit 70 and a refrigerant of the air conditioning circuit 70 is used as a hot energy source. The temperature adjustment mechanism 1 according to this embodiment includes the battery temperature adjustment circuit 10, the air conditioning circuit 70, and an indoor heat exchange circuit 80.

The battery temperature adjustment circuit 10 may have the same configuration as that of the first embodiment. Since the coolant is heated in the refrigerant-applied heat exchanger 16, the battery temperature adjustment circuit 10 may not include the battery-applied electric heater 17.

The air conditioning circuit 70 is a circuit in which the refrigerant circulates normally or reversely, and cools the vehicle compartment when the refrigerant circulates normally, and heats the vehicle compartment when the refrigerant circulates reversely. The air conditioning circuit 70 includes an air-conditioning-applied common passage 71, an air-conditioning-applied passage 72, a battery-applied passage 73, and an air-conditioning-applied flow path switching device 74 (The reference numeral 74 is not illustrated in the drawing. The reference numeral 74 is a generic term for a first air-conditioning-applied valve device 74*a* to the fourth air-conditioning-applied valve device 74*d* that are disposed in the air-conditioning-applied passage 72 and the battery-applied passage 73.).

In the air-conditioning-applied common passage 71, an electric compressor 75 and a condenser 76 are disposed in this order with respect to a flow of the normal circulation of the refrigerant during a cooling operation. In the air-conditioning-applied passage 72, an expansion valve 77 and an evaporator 78 are disposed in this order with respect to the flow of the normal circulation of the refrigerant during the cooling operation. The expansion valve 79 and the refrigerant-applied heat exchanger 16 are disposed in the battery-applied passage 73 with respect to the flow of the normal circulation of the refrigerant during the cooling operation.

In the air conditioning circuit 70, when the room temperature Tr is higher than the required temperature Td, the electric compressor 75 is driven by the electric power in the battery 2, the air-conditioning-applied passage 72 is opened by the first air-conditioning-applied valve device 74*a* and the third air-conditioning-applied valve device 74*c*, and the refrigerant is normally circulated counterclockwise in the drawing as in the first embodiment. In the air conditioning circuit 70, when the room temperature Tr is lower than the required temperature Td, the electric compressor 75 is driven by the electric power in the battery 2, the air-conditioning-applied passage 72 is opened by the first air-conditioning-applied valve device 74*a* and the third air-conditioning-applied valve device 74*c*, and the refrigerant is reversely circulated clockwise in the drawing in an opposite manner to the first embodiment. The high-pressure and high-temperature refrigerant discharged from the electric compressor 25 exchanges heat with the air blown by a subsequent electric fan in the evaporator 78 to warm the air. The hot air is blown into the vehicle compartment through the above-described process.

In the air conditioning circuit 70, in a situation where the battery temperature adjustment circuit 10 cools the coolant in the refrigerant-applied heat exchanger 16 using the refrigerant, or the battery temperature adjustment circuit 10 heats the coolant in the refrigerant-applied heat exchanger 16 using the refrigerant, the electric compressor 75 is driven by the electric power in the battery 2, the battery-applied passage 73 is opened by the second air-conditioning-applied valve device 74*b* and the fourth air-conditioning-applied valve device 24*d*, and the refrigerant is circulated through the air-conditioning-applied common passage 71 and the battery-applied passage 73. When the coolant is to be cooled, similarly to the first embodiment, the refrigerant circulates counterclockwise in the drawing, the refrigerant sprayed in the form of mist by the expansion valve 29 is vaporized by heat exchange with the coolant in the refrigerant-applied heat exchanger 16, and heat of vaporization is taken from the coolant. The coolant is cooled in the refrigerant-applied heat exchanger 16 through the process described above. When the coolant is to be heated, the refrigerant reversely circulates clockwise in the drawing in contrast to the first embodiment, and a high-temperature and high-pressure refrigerant in the electric compressor 75 exchanges heat with the coolant in the refrigerant-applied heat exchanger 16 and is cooled. The coolant is heated in the refrigerant-applied heat exchanger 16 through the above-described process.

The indoor heat exchange circuit 80 has a structure in which the heating-applied electric heater 33 and the sub-tank 35 are omitted from the heating circuit 30 according to the first embodiment, and includes a heat-exchange-applied pump 82 and an indoor-applied heat exchanger 83 that are provided in a heat exchange circuit 81.

When hot water is to be stored in the vacuum insulation tank 40, the temperature adjustment mechanism 1 according to the second embodiment sets a flow path of the coolant as that when cold water is stored in the vacuum insulation tank 40 according to the first embodiment, and supplies the high-temperature and high-pressure refrigerant to the refrigerant-applied heat exchanger 16 in the air conditioning circuit 70. Since other controls are the same as those in the first embodiment, description thereof is omitted.

As described above, even when the temperature adjustment mechanism 1 is configured to use the heat-pump type air conditioning circuit 70, as in the first embodiment, the temperature adjustment mechanism 1 can consume energy in a situation where electric power may be consumed during charging of the battery 2 from the external power supply to store the cold water or the hot water in the vacuum insulation tank 40, and use the cold water or the hot water stored in the vacuum insulation tank 40 to adjust the battery temperature Tb at the time of input or output of electric power in the battery 2 excluding a charge from the external power supply.

In the case of using the heat-pump type air conditioning circuit 70, both the cold water and the hot water can be stored in the vacuum insulation tank 40 only by the battery temperature adjustment circuit 10 and the air conditioning circuit 70. In this case, it is desirable to include the indoor heat exchange circuit 80. By providing the indoor heat exchange circuit 80, the room temperature can be adjusted only by consumption of electric power from the heat-exchange-applied pump 82 that sends cold water or the hot water to the indoor-applied heat exchanger 83 without operating the air conditioning circuit 70, and the electric power consumption required for adjusting the room temperature Tr can be reduced.

Although the embodiment of the present disclosure has been described above, the temperature adjustment mechanism 1 according to the present disclosure is not limited to a specific embodiment, and various modifications and changes are possible within the scope of the gist of the present disclosure.

A vehicle to which the temperature adjustment mechanism 1 can be applied is not limited to an electric vehicle. The temperature adjustment mechanism 1 according to the present disclosure is applicable to any vehicle on which the battery 2 chargeable from the external power supply is mounted, and is also applicable to a hybrid vehicle including an engine and a motor as a drive source of the vehicle. When the temperature adjustment mechanism 1 is applied to a hybrid vehicle, coolant of an engine driven by a circuit in addition to the heating circuit 30 may be used as a hot energy source generated by consumption of energy. Although the cold water cannot be stored in the vacuum insulation tank 40, if only the hot water is used, the temperature adjustment mechanism 1 of the present disclosure can also be applied to a vehicle on which a battery that cannot be charged from an external power supply is mounted.

The devices disposed in the battery-applied common passage 11 of the battery temperature adjustment circuit 10 may be disposed such that the refrigerant-applied heat exchanger 16 and the battery-applied electric heater 17 are disposed on an upstream side of the battery 2 with respect to the flow of the coolant, and other devices are not particularly limited. The sub-tank 18 is not necessarily required. The battery-applied flow path switching device 14 may be disposed at the branch point of the cooling passage 12 and the bypass passage 13 or may include a plurality of valve devices disposed in each passage as long as the cooling passage 12 and the bypass passage 13 can be switched.

In the cooling circuit 20, with respect to the flow of the refrigerant, a receiver may be interposed between the condenser 26 and the expansion valve 27 and the expansion valve 29 to separate a refrigerant that cannot be liquefied and remove moisture and impurities with a desiccant or a strainer. The cooling-applied flow path switching device 24 may include a three-way valve like the battery-applied flow path switching device 14, but it is necessary to cope with a state in which the refrigerant flows through both the evaporator 28 and the refrigerant-applied heat exchanger 16.

In the heating circuit 30, an arrangement order of each device in the heating-applied circulation passage 31 is not particularly limited. The sub-tank 35 is not necessarily required. As described above, in a vehicle on which an engine is mounted, the heating circuit 30 may be configured to use the coolant of the engine without providing the heating-applied electric heater 33.

A capacity of the vacuum insulation tank 40 is not particularly limited. An amount of water stored in the vacuum insulation tank 40 may be 100% (full) of the capacity of the vacuum insulation tank 40. In the present disclosure, storing cold water or the hot water in the vacuum insulation tank 40 means that the cold water or the hot water is injected into the vacuum insulation tank 40, the stored coolant is discharged, and the coolant is replaced with the cold water or the hot water. That is, storing cold water or the hot water in the vacuum insulation tank 40 means that only the temperature of the stored coolant changes without changing the amount of water stored in the vacuum insulation tank 40. When the amount of water stored in the vacuum insulation tank 40 is less than 100% of the capacity of the vacuum insulation tank 40, a sensor that acquires the amount of stored water may be used to add control to stop the supply of the cold water or the hot water from the vacuum insulation tank 40 when the amount of stored water is reduced. When the amount of water stored in the vacuum insulation tank 40 is constantly reduced, the coolant may be replenished from each of the sub-tanks 18 and 35.

The vacuum insulation tank 40 according to the above-described embodiment stores cold water or the hot water when the ambient temperature Ta is higher than the first threshold T1 or lower than the second threshold T2. That is, the vacuum insulation tank 40 is prohibited from storing water when the ambient temperature Ta is equal to or higher than the second threshold T2 and equal to or lower than the first threshold T1. For example, when the ambient temperature Ta is equal to or higher than the second threshold T2 and equal to or lower than the first threshold T1, spring and autumn are exemplified in Japan. This is because, when the ambient temperature Ta is equal to or higher than the second threshold T2 and equal to or lower than the first threshold T1, the cold energy source or the hot energy source may be less frequently used in the battery temperature adjustment, and the cold water or the hot water stored in the vacuum insulation tank 40 may not be used. When the ambient temperature Ta is equal to or higher than the second threshold T2 and equal to or lower than the first threshold T1, control may be performed to empty the vacuum insulation tank 40.

Even when the ambient temperature Ta falls below the second threshold T2, the battery temperature Tb may exceed the upper limit Th of the appropriate temperature range when the battery 2 is charged from the external power supply immediately after the electric vehicle travels. In this case, the battery temperature adjustment circuit 10 operates the cooling circuit 20 to cool the battery with the refrigerant so that the battery temperature Tb is kept within an appropriate temperature range. At this time, at the same time, the heating circuit 30 may be operated to start storing hot water in the vacuum insulation tank 40 immediately after charging, but it is preferable to start after a predetermined charging time has elapsed. The predetermined time is, for example, a time during which it can be determined that the battery temperature Tb is kept within an appropriate temperature range.

When the battery 2 is charged by a rapid charger using a three-phase 200V as the external power supply, it is desirable to prioritize charging of the battery 2 over storage of the cold water or the hot water in the vacuum insulation tank 40. Accordingly, it is advantageous to avoid a situation where the quick charging completion of the battery 2 by the rapid charger is hindered by the water stored in the vacuum insulation tank 40.

A temperature of the cold water or the hot water stored in the vacuum insulation tank 40 may be set in a temperature range suitable for supply to the battery temperature adjustment circuit 10. For example, if the temperature of the cold water is too low or the temperature of the hot water is too high, when the cold water or the hot water is supplied to the battery temperature adjustment circuit 10, the battery temperature Tb may deviate from the appropriate temperature range. Therefore, when the cold water is stored in the vacuum insulation tank 40, a lower limit threshold may be provided in addition to the third threshold T3, which is an upper limit, or when the hot water is stored in the vacuum insulation tank 40, an upper limit threshold may be provided in addition to the fourth threshold T4, which is a lower limit. When the temperature of the cold water or the hot water stored in the vacuum insulation tank 40 deviates from the temperature range suitable for supply to the battery temperature adjustment circuit 10, it is desirable to use the cold water or the hot water not for battery temperature adjustment but for room temperature adjustment.

As illustrated in FIG. 7, in order to adjust the battery temperature Tb, the cooling passage 12 and the bypass passage 13 in the battery temperature adjustment circuit 10 are switched. During charging of the battery 2 from the external power supply, since the electric vehicle is stopped, traveling air cannot be used. Therefore, during charging of the battery 2 from the external power supply, it is preferable to limit to the bypass passage 13 without switching between the cooling passage 12 and the bypass passage 13. Accordingly, it is possible to avoid a situation where the coolant cooled by the cold energy source is heated by the air-cooled heat exchanger 19 or the coolant heated by the hot energy source is cooled by the air-cooled heat exchanger 19. Similarly, when the cold water or the hot water stored in the vacuum insulation tank 40 is used in the battery temperature adjustment circuit 10 at the time of input or output of electric power in the battery 2, when the cold water is heated or the hot water is cooled by passing through the cooling passage 12, it is preferable to limit the passage to the bypass passage 13 without switching the passage.

The present application is based on the Japanese patent application (Patent Application No. 2021-047448) filed on Mar. 22, 2021, and the contents thereof are incorporated herein by reference.

INDUSTRIAL APPLICABILITY

The present disclosure has an effect that it is possible to reduce the decrease in a charge amount of a battery that is mounted on a vehicle and chargeable from an external power supply and extend a cruising distance of the vehicle while extending the life of the battery, and is useful for a temperature adjustment mechanism or the like that adjusts a temperature of the battery.

REFERENCE SIGNS LIST

1 temperature adjustment mechanism
2 battery
10 battery temperature adjustment circuit
15 battery-applied pump
16 refrigerant-applied heat exchanger
17 battery-applied electric heater
20 cooling circuit
25 electric compressor
26 condenser
27, 29 expansion valve
28 evaporator
30 heating circuit
32 heating-applied pump
33 heating-applied electric heater
34 heating-applied heat exchanger
40 vacuum insulation tank
41-45 connection pipe
50 flow path switching device
60 control device

The invention claimed is:

1. A temperature adjustment device for a vehicle, the temperature adjustment device comprising:

a chargeable battery, a battery-applied pump, a circulation path, a cold energy source due to consumption of energy, and a hot energy source due to consumption of energy, and configured to adjust a temperature of the battery to be within a predetermined temperature range by driving the battery-applied pump to allow a coolant to circulate through the circulation path:

a vacuum insulation tank in which either cold water generated by the cold energy source or hot water heated by the hot energy source is stored according to an ambient temperature around the vehicle during charging of the battery, wherein at a time of input and output of electric power in the battery excluding a charging of the battery, the vacuum insulation tank is connected to the circulation path, the cold water or the hot water stored in the vacuum insulation tank is supplied to the circulation path by driving the battery-applied pump, and battery temperature adjustment is performed such that the temperature of the battery is kept within the temperature range;

a cooling circuit, which is the cold energy source, using a refrigerant that circulates by an electric compressor;

a heating circuit, which is the hot energy source, using hot water heated by a heating-applied electric heater;

a battery temperature adjustment circuit including, in addition to the battery-applied pump and the circulation path, a refrigerant-applied heat exchanger configured to exchange heat between the refrigerant of the cooling circuit and the coolant, and a battery-applied electric heater;

a flow path switching device configured to switch a flow path of the coolant in the heating circuit and the battery temperature adjustment circuit via the vacuum insulation tank;

an ambient temperature acquisition device configured to acquire the ambient temperature around the vehicle;

a battery temperature acquisition device configured to acquire the temperature of the battery; and a control device configured to control the cooling circuit, the heating circuit, the battery temperature adjustment circuit, and the flow path switching device, wherein the vacuum insulation tank is connected to the heating circuit and the battery temperature adjustment circuit, and wherein the control device performs control to:

when the ambient temperature acquired by the ambient temperature acquisition device is higher than a preset first threshold during the charging of the battery, operate the cooling circuit serving as the cold energy source and drive the battery-applied pump, switch the flow path of the coolant by the flow path switching device to store, in the vacuum insulation tank, the cold water cooled by the refrigerant of the cooling circuit, or when the acquired ambient temperature is lower than a preset second threshold lower than the first threshold, operate the heating circuit serving as the hot energy source and drive the battery-applied pump, switch the flow path of the coolant by the flow path switching device to store, in the vacuum insulation tank, the hot water flowing through the heating circuit, and at the time of input and output of electric power in the battery excluding the charging of the battery, perform the battery temperature adjustment by driving the battery-applied pump, switching the flow path of the coolant by the flow path switching device based on the temperature of the battery acquired by the battery temperature acquisition device, and supplying the cold water or the hot water stored in the vacuum insulation tank to the battery temperature adjustment circuit.

2. The temperature adjustment device according to claim 1, wherein at the time of input and output of electric power in the battery excluding charging of the battery, when the battery temperature adjustment by supplying the cold water or the hot water stored in the vacuum insulation tank is unnecessary or impossible to be performed, the vacuum insulation tank is connected to a heat exchanger installed in a vehicle compartment, and the cold water or the hot water stored in the vacuum insulation tank is supplied to the heat exchanger to send cold air or hot air into the vehicle compartment.

3. The temperature adjustment device according to claim 1, further comprising:

a stored water temperature acquisition device configured to acquire a temperature of the cold water or the hot water stored in the vacuum insulation tank, wherein the control device prohibits a supply of the cold water or the hot water stored in the vacuum insulation tank to the battery temperature adjustment circuit when the cold water or the hot water is stored in the vacuum insulation tank and a temperature of the cold water acquired by the stored water temperature acquisition device is higher than a preset third threshold or a temperature of the hot water is lower than a preset fourth threshold, at the time of input and output of electric power in the battery excluding the charging of the battery.

4. The temperature adjustment device according to claim 3, wherein when the supply of the cold water or the hot water stored in the vacuum insulation tank to the battery temperature adjustment circuit is prohibited, the control device compares the temperature of the cold water or the hot water acquired by the stored water temperature acquisition device with a temperature required by an occupant, and when the temperature of the cold water is lower than the temperature or the temperature of the hot water is higher than the temperature, the control device switches the flow path of the coolant by the flow path switching device to supply the cold water or the hot water stored in the vacuum insulation tank to the heating circuit, and performs control to drive a heating-applied pump that allows the coolant to circulate through the heating circuit and stop a driving of the electric compressor or the heating-applied electric heater.

5. The temperature adjustment device according to claim 1, further comprising:

a stored water temperature acquisition device configured to acquire a temperature of the cold water or the hot water stored in the vacuum insulation tank; and an electric power amount acquisition device configured to acquire an amount of electric power output or charged from the battery, wherein the control device prohibits a supply of the cold water or the hot water stored in the vacuum insulation tank to the battery temperature adjustment circuit when a temperature of the battery acquired by the battery temperature acquisition device is kept within the temperature range and the amount of electric power acquired by the electric power amount acquisition device is equal to or less than a preset first load threshold or equal to or larger than a preset second load threshold, at the time of input and output of electric power in the battery excluding the charging of the battery.

6. The temperature adjustment device according to claim 1, wherein the battery temperature adjustment circuit further includes a cooling passage in which an air-cooled heat exchanger is interposed, and a bypass passage that bypasses the air-cooled heat exchanger, and the control device performs control to switch the flow path of the coolant in the battery temperature adjustment circuit to the bypass passage when the cold water or the hot water stored in the vacuum insulation tank is supplied to the battery temperature adjustment circuit.

7. The temperature adjustment device according to claim 1, wherein the control device prohibits storing water into the vacuum insulation tank when the ambient temperature acquired by the ambient temperature acquisition device is equal to or higher than the second threshold and equal to or lower than the first threshold, during the charging of the battery.

8. A temperature adjustment device for a vehicle, the temperature adjustment device comprising:

a chargeable battery, a battery-applied pump, a circulation path, a cold energy source due to consumption of energy, and a hot energy source due to consumption of energy, and configured to adjust a temperature of the battery to be within a predetermined temperature range by driving the battery-applied pump to allow a coolant to circulate through the circulation path;

a vacuum insulation tank in which either cold water generated by the cold energy source or hot water heated by the hot energy source is stored according to an ambient temperature around the vehicle during charging of the battery, wherein at a time of input and output of electric power in the battery excluding a charging of the battery, the vacuum insulation tank is connected to the circulation path, the cold water or the hot water stored in the vacuum insulation tank is supplied to the circulation path by driving the battery-applied pump, and battery temperature adjustment is performed such that the temperature of the battery is kept within the temperature range;

an air conditioning circuit, which is the cold energy source and the hot energy source, using a refrigerant that circulates normally or reversely by an electric compressor;

an indoor heat exchange circuit in which a coolant circulates by a heat-exchange-applied pump;

a battery temperature adjustment circuit including, in addition to the battery-applied pump and the circulation path, a refrigerant-applied heat exchanger configured to exchange heat between the refrigerant of the air conditioning circuit and the coolant;

a flow path switching device configured to switch a flow path of the coolant in the battery temperature adjustment circuit via the vacuum insulation tank;

an ambient temperature acquisition device configured to acquire the ambient temperature around the vehicle;

a battery temperature acquisition device configured to acquire the temperature of the battery; and a control device configured to control the air conditioning circuit, the battery temperature adjustment circuit, and the flow path switching device, wherein the vacuum insulation tank is connected to the indoor heat exchange circuit and the battery temperature adjustment circuit, and wherein the control device performs control to:

when the ambient temperature acquired by the ambient temperature acquisition device is higher than a preset first threshold or lower than a preset second threshold lower than the first threshold during the charging of the battery, operate the air conditioning circuit serving as the cold energy source and the hot energy source and drive the battery-applied pump, switch the flow path of the coolant by the flow path switching device to store, in the vacuum insulation tank, either the cold water cooled by the refrigerant of the air conditioning circuit or the hot water heated by the refrigerant of the air conditioning circuit, and at the time of input and output of electric power in the battery excluding the charging of the battery, perform the battery temperature adjustment by driving the battery-applied pump, switching the flow path of the coolant by the flow path switching device based on the temperature of the battery acquired by the battery temperature acquisition device, and supplying the cold water or the hot water stored in the vacuum insulation tank to the battery temperature adjustment circuit.

* * * * *